United States Patent
Broadus et al.

(10) Patent No.: US 11,020,944 B2
(45) Date of Patent: Jun. 1, 2021

(54) DELAMINATION-RESISTANT HEAT-SHRINKABLE MULTILAYER OXYGEN BARRIER FILM CONTAINING POLYESTER

(71) Applicant: Cryovac, LLC, Charlotte, NC (US)

(72) Inventors: Michael Broadus, Mauldin, SC (US); Bryan Freeman, Enoree, SC (US); J. Douglas Wilson, Fountain Inn, SC (US); Randall Brush, Gray Court, SC (US); Donny Kay, Woodruff, SC (US); Sumita Sanjeevi Ranganathan, Simpsonville, SC (US); Kevin McCormick, Taylors, SC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/438,909

(22) Filed: Jun. 12, 2019

(65) Prior Publication Data
US 2019/0291396 A1    Sep. 26, 2019

Related U.S. Application Data

(63) Continuation of application No. 15/033,304, filed as application No. PCT/US2014/063600 on Nov. 1, 2014, now Pat. No. 10,843,443.
(Continued)

(51) Int. Cl.
*B32B 7/02* (2019.01)
*B32B 27/08* (2006.01)
(Continued)

(52) U.S. Cl.
CPC ................ *B32B 27/08* (2013.01); *B32B 1/08* (2013.01); *B32B 7/12* (2013.01); *B32B 27/302* (2013.01);
(Continued)

(58) Field of Classification Search
CPC ... B32B 27/302; B32B 27/304; B32B 27/306; B32B 27/32; B32B 27/325;
(Continued)

(56) References Cited

U.S. PATENT DOCUMENTS

| 3,570,052 A | 3/1971 | Reade |
| 4,064,296 A | 12/1977 | Bornstein et al. |

(Continued)

FOREIGN PATENT DOCUMENTS

| CA | 2311499 | 6/1999 |
| CA | 2347031 | 5/2000 |

(Continued)

OTHER PUBLICATIONS

Machine translation of EP-1970310 (Year: 2008).*

(Continued)

*Primary Examiner* — Zachary M Davis
(74) *Attorney, Agent, or Firm* — Jason R. Womer

(57) ABSTRACT

A first multilayer shrink film has an outer polyester layer, an inner $O_2$-barrier layer, and a tie layer between the polyester layer and the barrier layer. A second multilayer film an outer polyester layer, an inner polyamide layer, and a tie layer between the polyester and polyamide layers. The tie layer comprises a styrene-based polymer, and the tie layer in the second film comprises an anhydride functional styrene based copolymer. Included are a packaging article comprising the film, a packaging process utilizing the film, a process for making the film, and a packaged product comprising a packaging article made the film, with a product inside the package.

19 Claims, 10 Drawing Sheets

Related U.S. Application Data

(60) Provisional application No. 61/898,757, filed on Nov. 1, 2013, provisional application No. 61/976,850, filed on Apr. 8, 2014, provisional application No. 62/055,144, filed on Sep. 25, 2014.

(51) Int. Cl.

| | | |
|---|---|---|
| *B32B 27/30* | (2006.01) | |
| *B32B 27/34* | (2006.01) | |
| *B32B 27/36* | (2006.01) | |
| *B32B 27/32* | (2006.01) | |
| *B32B 1/08* | (2006.01) | |
| *B32B 7/12* | (2006.01) | |
| *B65D 71/08* | (2006.01) | |

(52) U.S. Cl.
CPC .......... *B32B 27/304* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B65D 71/08* (2013.01); *B32B 2270/00* (2013.01); *B32B 2307/31* (2013.01); *B32B 2307/514* (2013.01); *B32B 2307/58* (2013.01); *B32B 2307/704* (2013.01); *B32B 2307/724* (2013.01); *B32B 2307/7244* (2013.01); *B32B 2307/736* (2013.01); *B32B 2439/40* (2013.01); *B32B 2439/70* (2013.01)

(58) Field of Classification Search
CPC ....... B32B 27/327; B32B 27/36; B32B 27/34; C08F 12/08; C08F 112/08; C08F 212/08; C08F 255/00; C08F 255/02; C08F 255/023; C08F 255/026; C08F 255/255; C08F 255/04; C08F 255/06; C08F 255/08; C08F 255/10
See application file for complete search history.

(56) References Cited

U.S. PATENT DOCUMENTS

| | | | |
|---|---|---|---|
| 4,095,012 A | 6/1978 | Schirmer | |
| 4,120,716 A | 10/1978 | Bonet | |
| 4,390,587 A | 6/1983 | Yoshimura et al. | |
| 4,430,377 A | 2/1984 | Yoshimura et al. | |
| 4,560,520 A | 12/1985 | Erk et al. | |
| 4,732,795 A | 3/1988 | Ohya et al. | |
| 4,879,430 A | 11/1989 | Hoffman | |
| 4,883,693 A | 11/1989 | Ohya et al. | |
| 4,945,129 A | 7/1990 | Mason et al. | |
| 4,963,426 A | 10/1990 | Nishimoto et al. | |
| 5,053,259 A | 10/1991 | Vicik | |
| 5,206,075 A | 4/1993 | Hodgson, Jr. | |
| 5,241,031 A | 8/1993 | Mehta | |
| 5,270,390 A | 12/1993 | Shibuya et al. | |
| 5,272,236 A | 12/1993 | Lai et al. | |
| 5,278,272 A | 1/1994 | Lai et al. | |
| 5,336,549 A | 8/1994 | Nishimoto et al. | |
| 5,491,019 A | 2/1996 | Kuo | |
| 5,534,277 A | 7/1996 | Ramesh et al. | |
| 5,658,625 A | 8/1997 | Bradfute et al. | |
| 5,688,456 A | 11/1997 | Kuriu et al. | |
| 5,824,398 A | 10/1998 | Shih | |
| 5,859,116 A | 1/1999 | Shih | |
| 5,859,137 A | 1/1999 | Chou | |
| 6,110,600 A | 8/2000 | Ramesh | |
| 6,146,726 A | 11/2000 | Yoshii et al. | |
| 6,197,419 B1 | 3/2001 | Hyde et al. | |
| 6,203,750 B1 | 3/2001 | Ahlgren et al. | |
| 6,214,476 B1 | 4/2001 | Ikeda et al. | |
| 6,274,228 B1 | 8/2001 | Ramesh et al. | |
| 6,278,613 B1 | 8/2001 | Fernandez et al. | |
| 6,299,984 B1 | 10/2001 | Forloni | |
| 6,342,282 B1 | 1/2002 | Yoshii et al. | |
| 6,406,763 B1* | 6/2002 | Wolf | B32B 27/32 426/112 |
| 6,565,985 B2 | 5/2003 | Ueyama et al. | |
| 6,610,392 B1 | 8/2003 | Ramesh et al. | |
| 6,623,821 B1 | 9/2003 | Kendig | |
| 6,682,825 B1 | 1/2004 | Kennedy et al. | |
| 6,699,549 B1 | 3/2004 | Ueyama et al. | |
| 6,764,729 B2 | 7/2004 | Ramesh et al. | |
| 6,858,313 B2 | 2/2005 | Musco et al. | |
| 6,964,816 B2 | 11/2005 | Schell et al. | |
| 7,018,719 B2 | 3/2006 | Ueyama et al. | |
| 7,201,966 B2 | 4/2007 | Lischefski | |
| 7,207,157 B2 | 4/2007 | Wolf et al. | |
| 7,211,306 B2 | 5/2007 | Peiffer et al. | |
| 7,237,371 B2 | 7/2007 | Yamamoto et al. | |
| 7,504,143 B2 | 3/2009 | Schief et al. | |
| 7,517,569 B2 | 4/2009 | Kreitman | |
| 7,569,276 B2 | 8/2009 | Kendig et al. | |
| 7,687,123 B2 | 3/2010 | Broadus et al. | |
| 7,744,806 B2 | 6/2010 | Broadus et al. | |
| 7,891,159 B2 | 2/2011 | Iocco et al. | |
| 7,951,461 B2 | 5/2011 | ReFraschini et al. | |
| 7,959,995 B2 | 6/2011 | Ishii et al. | |
| 7,993,713 B2 | 8/2011 | Ishii et al. | |
| 8,039,070 B1 | 10/2011 | Sawall et al. | |
| 8,129,007 B2 | 3/2012 | Forloni | |
| 8,178,210 B2 | 5/2012 | Forloni et al. | |
| 8,247,047 B2 | 8/2012 | Ishii et al. | |
| 8,273,447 B2 | 9/2012 | Forloni | |
| 8,481,137 B2 | 7/2013 | Uehara et al. | |
| 8,697,211 B2 | 4/2014 | Gkinosatis | |
| 8,707,660 B2 | 4/2014 | Howes | |
| 8,741,433 B2 | 6/2014 | Schell et al. | |
| 9,352,395 B2 | 5/2016 | Ueyama et al. | |
| 9,566,768 B2 | 2/2017 | Ibe et al. | |
| 2002/0012803 A1 | 1/2002 | Kending | |
| 2003/0198764 A1 | 10/2003 | Kendig | |
| 2004/0001960 A1 | 1/2004 | Trouilhet et al. | |
| 2004/0033382 A1 | 2/2004 | Kendig | |
| 2004/0241481 A1 | 12/2004 | Ichige et al. | |
| 2005/0129969 A1 | 6/2005 | Schell et al. | |
| 2005/0235611 A1 | 10/2005 | Roussos | |
| 2006/0222793 A1 | 10/2006 | Kashimura et al. | |
| 2006/0246242 A1 | 11/2006 | Siegel et al. | |
| 2007/0031546 A1 | 2/2007 | Nelson et al. | |
| 2007/0100076 A1 | 5/2007 | Hayes et al. | |
| 2007/0172614 A1 | 7/2007 | Lee | |
| 2007/0202337 A1 | 8/2007 | Lischefski et al. | |
| 2007/0212550 A1 | 9/2007 | ReFraschini et al. | |
| 2008/0057236 A1 | 3/2008 | Yamada et al. | |
| 2008/0179780 A1 | 7/2008 | Broadus et al. | |
| 2008/0197540 A1 | 8/2008 | Mcallister et al. | |
| 2009/0029081 A1* | 1/2009 | Lee | B32B 27/34 428/34.9 |
| 2009/0061129 A1 | 3/2009 | Fraschini et al. | |
| 2009/0123613 A1 | 5/2009 | Hayes et al. | |
| 2010/0003432 A1 | 1/2010 | Schiffman | |
| 2010/0024784 A1 | 2/2010 | Lin | |
| 2010/0028574 A1 | 2/2010 | Gkinosatis | |
| 2010/0034999 A1 | 2/2010 | Schiffman | |
| 2010/0068355 A1 | 3/2010 | Berry et al. | |
| 2010/0086711 A1 | 4/2010 | Kaneta et al. | |
| 2010/0209637 A1 | 8/2010 | Munekata et al. | |
| 2010/0209687 A1 | 8/2010 | Zhu | |
| 2010/0266791 A1 | 10/2010 | Gkinosatis | |
| 2010/0323069 A1* | 12/2010 | Rubinstein | B32B 27/08 426/113 |
| 2011/0081534 A1 | 4/2011 | Watkinson | |
| 2011/0200770 A1 | 8/2011 | Uehara et al. | |
| 2011/0262668 A1 | 10/2011 | Akkapeddi et al. | |
| 2011/0315590 A1 | 12/2011 | Uehara et al. | |
| 2012/0211150 A1 | 8/2012 | McAllister, Jr. et al. | |
| 2012/0276377 A1 | 11/2012 | Yoshino et al. | |
| 2013/0224412 A1 | 8/2013 | Muta et al. | |
| 2014/0017490 A1 | 1/2014 | Forloni | |
| 2014/0044980 A1 | 2/2014 | Schiffmann | |
| 2014/0066228 A1 | 3/2014 | Bulpett et al. | |
| 2014/0234493 A1 | 8/2014 | Forloni | |

(56) References Cited

U.S. PATENT DOCUMENTS

2014/0250838 A1  9/2014  Nathan
2017/0144416 A1  5/2017  Broadus et al.
2017/0198123 A1  7/2017  Zanaboni et al.

FOREIGN PATENT DOCUMENTS

| | | |
|---|---|---|
| EP | 0585459 | 3/1994 |
| EP | 0692374 | 1/1996 |
| EP | 0967073 | 12/1999 |
| EP | 0974452 | 1/2000 |
| EP | 1207042 | 1/2004 |
| EP | 1410902 | 4/2004 |
| EP | 1172202 | 11/2004 |
| EP | 1905575 | 4/2008 |
| EP | 1970310 | 11/2009 |
| EP | 2474483 | 7/2012 |
| EP | 1993809 | 9/2012 |
| EP | 2682419 | 1/2014 |
| JP | 2001071442 | 3/2001 |
| JP | 3356200 | 12/2002 |
| JP | 2005161670 | 6/2005 |
| JP | 2005161671 | 6/2005 |
| JP | 2006063134 | 3/2006 |
| JP | 2007001878 | 1/2007 |
| JP | 2007079280 | 3/2007 |
| JP | 2010058365 | 3/2010 |
| JP | 2010058366 | 3/2010 |
| WO | 9003414 | 4/1990 |
| WO | 9303093 | 2/1993 |
| WO | 9532095 | 11/1995 |
| WO | 2013080143 | 6/2013 |

OTHER PUBLICATIONS

Machine translation of FR-2897795 (equivalent of EP-1993809) (Year: 2006).*
JP-3356200 Abstract (Year: 2002).*
JP 2010-058365 Abstract (Year: 2010).*
JP 2010-058366 Abstract (Year: 2010).*

* cited by examiner

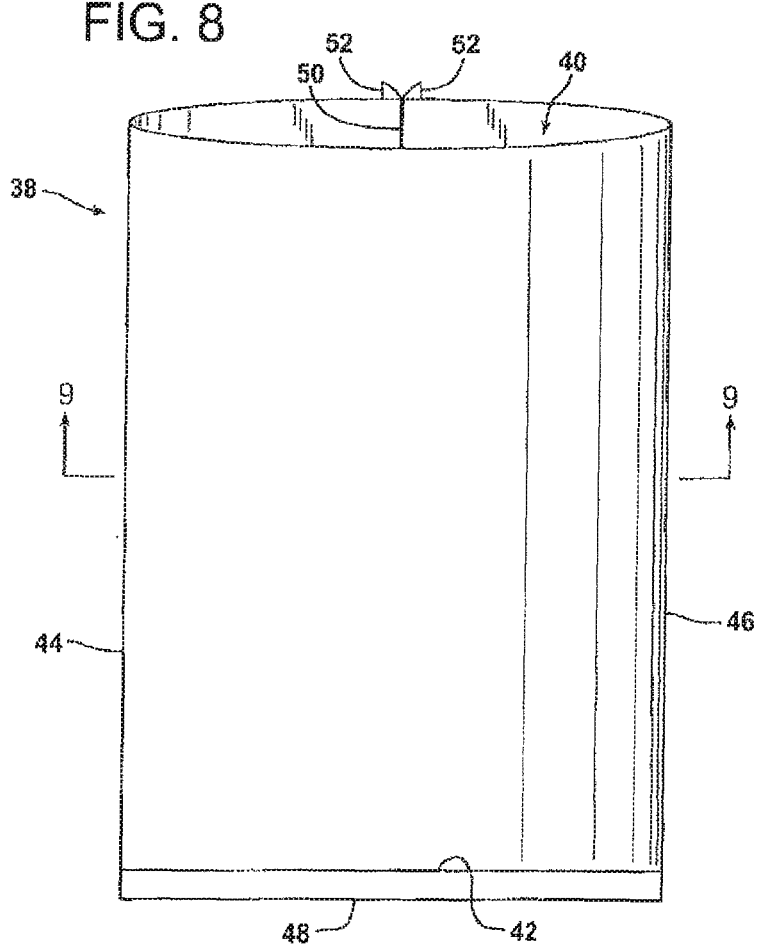
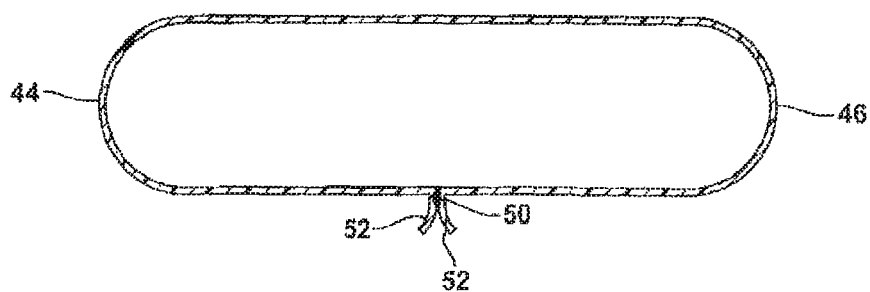

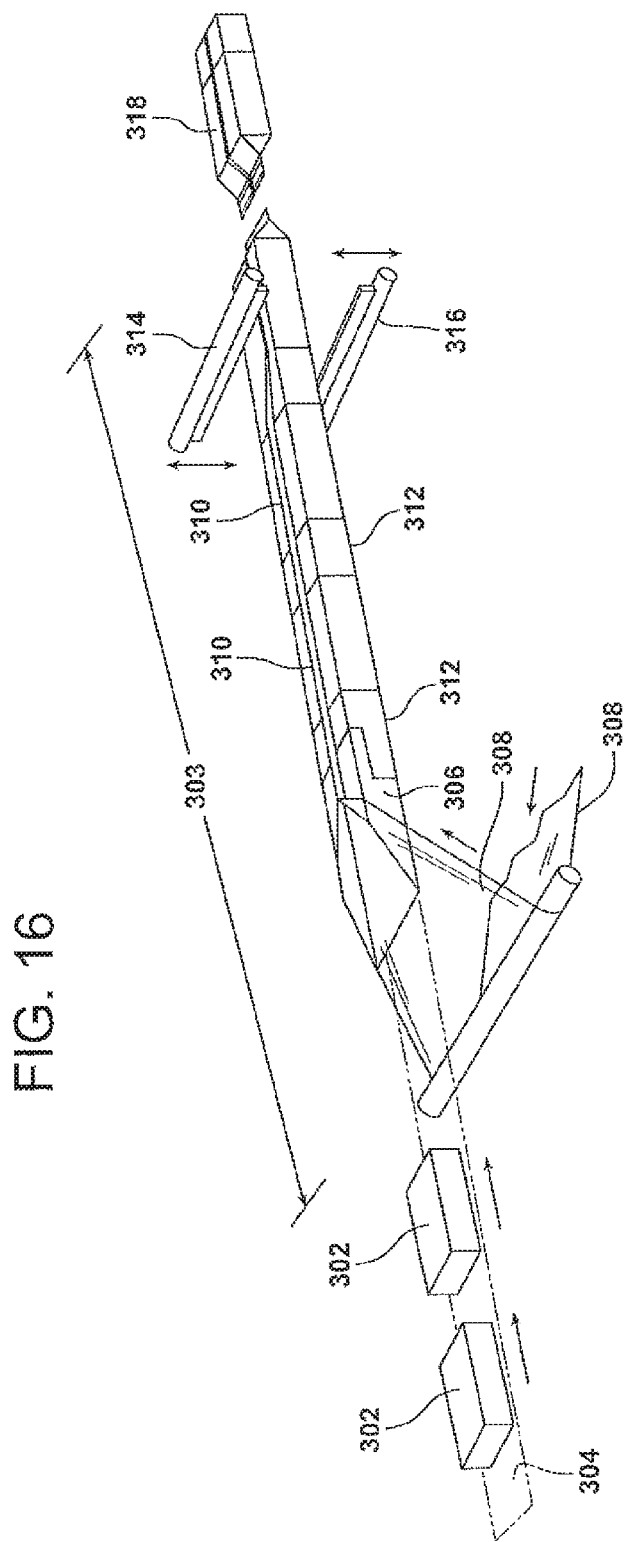

DELAMINATION-RESISTANT HEAT-SHRINKABLE MULTILAYER OXYGEN BARRIER FILM CONTAINING POLYESTER

CROSS-REFERENCE TO RELATED APPLICATIONS

This application claims priority to and is continuation of U.S. patent application Ser. No. 15/033,304 filed Apr. 29, 2016, the entirety of which is incorporated herein by reference, which is a national stage entry of application US2014/063600 filed Nov. 1, 2014. This application claims priority to provisional U.S. Patent Application Ser. No. 61/976,850, filed Apr. 8, 2014, entitled "Heat-Shrinkable Multilayer Barrier Film Containing High Melt Point Polyester," which is hereby incorporated, in its entirety, by reference thereto. This application also claims priority to provisional U.S. Patent Application Ser. No. 61/898,757, filed Nov. 1, 2013, also entitled "Heat-Shrinkable Multilayer Barrier Film Containing High Melt Point Polyester," which is also hereby incorporated, in its entirety, by reference thereto. This application also claims priority to provisional U.S. Patent Application Ser. No. 62/055,144, filed Sep. 25, 2014, also entitled "Heat-Shrinkable Multilayer Film with Tie Layer Bonding Polyester to Polyamide," which is also hereby incorporated, in its entirety, by reference thereto.

BACKGROUND

Multilayer heat shrinkable films having an oxygen barrier layer have been used for the vacuum packaging of oxygen-sensitive products, including food products, and particularly meat products. Upon evacuating atmosphere from the package followed by sealing the package closed while under evacuation, the resulting closed package is thereafter shrunk around the meat product. Shrinking causes the film to retract against the meat product, reducing the amount of excess film protruding away from the meat product, improving the appearance and function of the package.

Meat and cheese products, as well as other foods and non-food products, generate abrasion abuse and puncture abuse of the films in which the products are packaged. As a result, tough, abrasion-resistant films are needed for the packaging of various food and non-food products, particular dense products and/or products with sharp edges, such as bone-in meat products.

Heat shrinkable oxygen barrier films which are shrinkable at relatively low temperature, have good heat sealability and relatively high strength have been developed and used for the packaging of a wide variety of products, including meat products. However, these ethylene-based shrink films were found to lack the abrasion and puncture resistance needed for the packaging of products which produce high levels of abuse to the packaging when handled, such as meat and cheese products. As a result, there has been a need for more abuse resistant heat shrinkable multilayer films having an oxygen barrier layer.

The amount of abuse from abrasion and puncture varies with the product being packaged. Some products are highly abusive due to the combination of the weight and shape of the product as well as any particularly hard and/or sharp portions locations on the product. In recent years polyamide-based patchless shrink bags have been commercialized, these bags providing sufficient abuse resistance for the packaging of meat and cheese products, including some bone-in meat products. However, polyamide-based heat shrinkable films have proven to be unstable during storage, shipment, and use. More particularly, polyamide-based films tend to shrink upon exposure to atmospheric moisture and/or heat encountered during storage and/or transport. This instability is problematic for subsequent use in packaging meat and other products.

SUMMARY

In an effort to develop a multilayer heat shrinkable oxygen barrier film having improved abuse resistance and temperature stability for the packaging of meat and cheese products and other food and non-food oxygen-sensitive products, the inventors of the present invention conducted research in an effort to develop a suitable packaging film utilizing a film containing polyester in place of some or all of the polyamide used in heat shrinkable oxygen barrier films of the prior art. It was discovered that by substituting the polyester for some or all of the polyamide, the polyester layers were capable of providing adequate toughness and abrasion resistance and dimensional stability over time, together with temperature stability superior to corresponding polyamide-based films.

However, polyester has been found to be difficult to bond to other thermoplastic film layers for use in a heat shrinkable film. Most co-extrudable tie layers that have been used to bond to polyester are composed of maleic anhydride grafted-ethylene/methylacrylate copolymer (g-EMA). It has been discovered that tie layers made from g-EMA are not sufficient to prevent delamination between the polyester layer and (i) an internal layer comprising polyamide or (ii) an oxygen barrier layer made from ethylene/vinyl alcohol copolymer (EVOH). In such films delamination occurred at the interface between the polyester layer and the tie layer. The delamination occurred upon shrinking the film, and sometime even during the manufacture of the film.

A solution to the delamination problem was sought in the development of a tough and abuse-resistant heat shrinkable polyester-containing film which also exhibited the further desired features of: (i) total unrestrained free shrink at 85° C. of at least 10% using ASTM D 2732, (ii) low oxygen transmission rate, and (iii) heat sealability. It is believed that inter-layer shear force is produced during shrinking. This shear force may produce delamination if it exceeds the level of adhesion to the adjacent layer.

Investigation revealed that the reason for the delamination during shrinking was that upon immersion in water at 85° C., the outer polyester layer was shrinking faster and with greater shrink force than the tie layer and additional layers of the film. The less than adequate bonding force between the inner tie layer and the outer polyester layer was overcome by the differences in the shrink rates of the layers, in combination with the high shrink force of the polyester layer, resulting in delamination.

It has been discovered that the delamination upon shrinking problem can be overcome by providing the inner tie layer with a styrene-based polymer, such as styrene-ethylene-butylene-styrene copolymer. In multilayer shrink films having an outer polyester layer and an internal oxygen-barrier layer made from EVOH, with no polyamide between the polyester layer and the EVOH layer, it was found that delamination could be prevented by using a styrene-based polymer that need not contain anhydride functionality. However, in films in which the tie layer was directly adhered to both the outer polyester layer and an internal polyamide layer it was discovered that an anhydride functional styrene-based polymer was needed to prevent the film from delaminating upon shrinking.

Exactly why the styrene-based polymer prevents delamination is not known. However, factors which could bring about this outcome include providing the inner tie layer with greater elasticity, as well as providing the inner tie layer with a greater bond strength to the outer polyester layer.

A first aspect is directed to a multilayer heat-shrinkable film comprising: (i) a first layer comprising a first polyester, (ii) a second layer which serves as an $O_2$-barrier layer, and (iii) a third layer between the first layer and the second layer. The first layer is an outer film layer. The second layer comprises at least one member selected from the group consisting of saponified ethylene/vinyl acetate copolymer, polyamide MXD6, polyamide 6I/6T, polyamide 6, polyvinylidene chloride, polyethylene naphthalate, polytrimethylene terephthalate, liquid crystal polymer, and $O_2$-scavenger. The third layer serves as a tie layer and comprises at least one styrene-based copolymer. The multilayer heat shrinkable film exhibits a total free shrink at 85° C. of at least 10% measured in accordance with a modified free shrink test otherwise in accordance with ASTM D 2732. The polyester is present in the film in an amount of at least 2 vol %, based on total film volume.

In an embodiment, the third layer (i.e., the tie layer) is directly adhered to the first layer.

In an embodiment, the film does not have a layer comprising a polyamide between the first layer and the second layer.

In an embodiment, the styrene-based polymer makes up from 10 to 100 wt % of the weight of the third layer.

In an embodiment, the third layer comprises the styrene-based polymer in an amount of at least 5 wt %, based on layer weight; or from 5 to 100 wt %, or from 8 to 100 wt %, or from 10 to 100 wt %, or from 10 to 90 wt %, or from 10 to 80 wt %, or from 10 to 60 wt %, or from 10 to 40 wt %, or from 10 to 30 wt %, or from 10 to 25 wt %, or from 10 to 20 wt %, or from 10 to 15 wt %, or from 50 to 100 wt %, or from 60 to 90 wt %, based on layer weight.

In an embodiment, the styrene-based polymer comprises at least one member selected from the group consisting of styrene-ethylene-butylene-styrene copolymer, styrene-butadiene-styrene copolymer, styrene-isoprene-styrene copolymer, styrene-ethylene-butadiene-styrene copolymer, styrene-(ethylene-propylene rubber)-styrene copolymer, and polystyrene-poly(ethylene-propylene)-polystyrene copolymer.

In an embodiment, the third layer comprises a blend of the styrene-based copolymer and at least one member selected from cyclic olefin copolymer and ethylene/unsaturated ester copolymer.

In an embodiment, the third layer comprises a blend of the styrene-based polymer and an acrylate based polymer. In an embodiment, the styrene-based polymer makes up from 5 to 95 wt % of the blend, and the acrylate based polymer makes up from 5 to 95 wt % of the blend, and the styrene-based polymer and the acrylate based together make up at least 70 wt % of the blend.

In an embodiment, the styrene-based polymer makes up from 5 to 40 wt % of the blend, and the acrylate based polymer makes up from 60 to 95 wt % of the blend.

In an embodiment, the styrene-based polymer makes up from 10 to 20 wt % of the blend, and the acrylate based polymer makes up from 80 to 90 wt % of the blend.

In an embodiment in which the third layer comprises a blend of the styrene-based polymer and a cyclic polymer, the styrene-based polymer can make from 5 to 95 wt % of the blend, and the cyclic polymer makes up from 5 to 95 wt % of the blend, with the styrene-based polymer and the cyclic polymer together making up at least 70 wt % of the blend. In an embodiment, the styrene-based polymer makes up from 60 to 95 wt % of the blend, and the cyclic polymer makes up from 5 to 40 wt % of the blend. In an embodiment, the styrene-based polymer makes up from 80 to 90 wt % of the blend, and the cyclic polymer makes up from 10 to 20 wt % of the blend.

In an embodiment, the third layer comprises a blend of the styrene-based polymer and a modified polyolefin. In an embodiment, the styrene-based polymer makes up from 5 to 95 wt % of the blend, and the modified polyolefin makes up from 5 to 95 wt % of the blend, and the styrene-based polymer and the modified polyolefin together make up at least 70 wt % of the blend. In an embodiment, the styrene-based polymer makes up from 5 to 40 wt % of the blend, and the modified polyolefin makes up from 60 to 95 wt % of the blend. In an embodiment, the styrene-based polymer makes up from 10 to 20 wt % of the blend, and the modified polyolefin makes up from 80 to 90 wt % of the blend.

In an embodiment, the third layer comprises a blend of the styrene-based polymer, an acrylate based polymer, and a cyclic polymer. In an embodiment, the styrene-based polymer makes up from 5 to 90 wt % of the blend, the acrylate based polymer makes up from 5 to 90 wt % of the blend, and the cyclic polymer makes up from 5 to 90 wt % of the blend, and the styrene-based polymer, the acrylate based polymer, and the cyclic polymer together make up at least 70 wt % of the blend. The styrene-based polymer makes up from 5 to 40 wt % of the blend, the acrylate based polymer makes up from 20 to 90 wt % of the blend, and the cyclic polymer makes up from 5 to 40 wt % of the blend. The styrene-based polymer makes up from 10 to 20 wt % of the blend, the acrylate based polymer makes up from 30 to 80 wt % of the blend, and the cyclic polymer makes up from 10 to 20 wt % of the blend.

In an embodiment, the third layer comprises a blend of the styrene-based polymer, an acrylate based polymer, and a modified polyolefin. In an embodiment, the styrene-based polymer makes up from 5 to 90 wt % of the blend, the acrylate-based polymer makes up from 5 to 90 wt % of the blend, and the modified polyolefin makes up from 5 to 90 wt % of the blend, and the styrene-based polymer, the acrylate-based polymer, and the modified polyolefin together make up at least 70 wt % of the blend. The styrene-based polymer makes up from 5 to 40 wt % of the blend, the acrylate-based polymer makes up from 20 to 90 wt % of the blend, and the modified polyolefin makes up from 5 to 40 wt % of the blend. The styrene-based polymer makes up from 10 to 20 wt % of the blend, the acrylate-based polymer makes up from 30 to 80 wt % of the blend, and the modified polyolefin makes up from 10 to 20 wt % of the blend.

In an embodiment, the inner third layer comprises a blend of the styrene-based polymer, a cyclic polymer, and a modified olefin copolymer. In an embodiment, the styrene-based polymer makes up from 5 to 90 wt % of the blend, the cyclic polymer, makes up from 5 to 90 wt % of the blend, and the modified olefin copolymer makes up from 5 to 90 wt % of the blend, and the styrene-based polymer, the cyclic polymer, and the modified polyolefin together make up at least 70 wt % of the blend. The styrene-based polymer makes up from 5 to 40 wt % of the blend, the cyclic polymer can makes up from 20 to 90 wt % of the blend, and the modified olefin copolymer makes up from 5 to 40 wt % of the blend. The styrene-based polymer makes up from 10 to 20 wt % of the blend, the cyclic polymer makes up from 30 to 80 wt % of the blend, and the modified olefin copolymer makes up from 10 to 20 wt % of the blend.

In an embodiment, the inner third layer comprises a blend of the styrene-based polymer, an acrylate based polymer, a cyclic polymer, and a modified polyolefin. In an embodiment, the styrene-based polymer makes up from 5 to 85 wt % of the blend, the acrylate-based polymer makes up from 5 to 85 wt % of the blend, the cyclic polymer makes up from 5 to 85 wt % of the blend, and the modified polyolefin makes up from 5 to 85 wt % of the blend, with the styrene-based polymer, the acrylate-based polymer, the cyclic polymer and the modified polyolefin together making up at least 70 wt % of the blend. In an embodiment, the styrene-based polymer makes up from 10 to 40 wt % of the blend, the acrylate-based polymer makes up from 10 to 40 wt % of the blend, the cyclic polymer makes up from 10 to 40 wt % of the blend, and the modified polyolefin makes up from 10 to 40 wt % of the blend. In an embodiment, the styrene-based polymer makes up from 10 to 20 wt % of the blend, the acrylate-based polymer makes up from 10 to 80 wt % of the blend, the cyclic polymer makes up from 5 to 20 wt % of the blend, and the modified polyolefin makes up from 10 to 80 wt % of the blend.

In an embodiment, the cyclic olefin copolymer comprises ethylene/norbornene copolymer.

In an embodiment, the blend further comprises at least one member selected from the group consisting of a second polyester and a modified polyolefin.

In an embodiment, the second polyester comprises a copolyester, and the blend comprises: (i) at least one member selected from the group consisting of styrene-ethylene-butylene-styrene block copolymer and styrene-butadiene block copolymer, (ii) ethylene/acrylate copolymer; and (iii) at least one member selected from the group consisting of copolyester and anhydride-modified polyolefin.

In an embodiment, the blend comprises: (i) from 10 to 90 wt %, based on total blend weight, of at least one member selected from the group consisting of styrene-ethylene-butylene-styrene triblock copolymer and styrene-butadiene multiblock copolymer; (ii) ethylene/methyl acrylate copolymer in an amount of from 10 to 90 wt %, based on total blend weight; and (iii) from 5 to 30 wt %, based on total blend weight, of at least one member selected from the group consisting of amorphous copolyester having a melting point of from 100° C. to 185° C., and anhydride-modified ethylene/alpha-olefin copolymer.

In an embodiment, the copolyester is a semi-crystalline, thermoplastic, linear saturated copolyester having a density of from 1.15 to 1.30 g/cm$^3$, a melting point of from 115° C. to 125° C., and a melt index of from 0.5 to 2 g/10 min.

In an embodiment, the blend comprises from 5 to 15 wt %, based on total blend weight, of at least one member selected from the group consisting of copolyester having a melting point of from 105° C. to 140° C. and anhydride-modified linear low density polyethylene.

In an embodiment in which the tie layer comprises a modified polyolefin, the modified polyolefin can comprise at least one member selected from the group consisting of a grafted anhydride functionality, a copolymerized anhydride functionality, and a blend of the polyolefin and another polymer having an anhydride functionality.

In an embodiment in which the tie layer comprises an acrylate-based polymer, the acrylate based polymer can comprise at least one member selected from the group consisting of ethylene/methyl acrylate copolymer, ethylene/ethyl acrylate copolymer, ethylene/butyl acrylate copolymer, and ethylene/vinyl acetate copolymer.

In an embodiment in which the tie layer comprises a cyclic polymer, the cyclic polymer can comprise at least one member selected from the group consisting of ethylene/norbornene copolymer, and ethylene/tetracyclododecene copolymer, and cyclic olefin polymer.

In an embodiment, the second layer comprises saponified ethylene vinyl acetate copolymer.

In an embodiment, the first polyester comprises at least one semi-crystalline polyester selected from the group consisting of polyethylene terephthalate homopolymer, polyethylene terephthalate copolymer, polybutylene terephthalate homopolymer, polybutylene terephthalate copolymer, polynaphthalene terephthalate homopolymer, polynaphthalene terephthalate copolymer, polyethylene furanoate homopolymer, and polyethylene furanoate copolymer, wherein the semicrystalline polyester has a melting point of from 80° C. to 265° C.

In an embodiment, the first polyester comprises polyethylene terephthalate homopolymer having a melting point of at least 240° C.

In an embodiment, the polyethylene terephthalate homopolymer has a melting point of at least 240° C. and is present in the first layer in an amount of at least 95 wt %, based on the weight of the first layer.

In an embodiment, the first polyester comprises amorphous polyester.

In an embodiment, the polyester has a melting point of at least 240° C. and is present in the film in an amount making up at least 25 volume % of the film and comprises at least one member selected from the group consisting of polyethylene terephthalate and polyethylene furanoate.

In an embodiment, at least 50 wt % of polyester in the film is present in the outer film layer, based on total polyester in the film, or at least 60 wt % of the polyester is present in the outer film layer, or at least 70 wt % of the polyester is present in the outer film layer, or at least 80 wt % of the polyester is present in the outer film layer, or at least 90 wt % of the polyester is present in the outer film layer, or at least 95 wt % of the polyester is present in the outer film layer, or 100 wt % of the polyester is present in the outer film layer, based on total polyester in the film.

In an embodiment, the film does not have an internal layer comprising polyester. In an embodiment, the polyester is a copolyester.

In an embodiment, the film has an internal layer comprising polyester and the polyester is in an interpenetrating polymer network. In an alternative embodiment, the film has an internal layer comprising polyester but the polyester which is not in an interpenetrating polymer network.

In an embodiment, the multilayer heat-shrinkable film has a thickness of from 0.7 mil to 10 mils, or from 1 mil to 8 mils, or from 1.1 mil to 7 mils, or from 1.2 mil to 6 mils, or from 1.2 mils to 5 mils, or from 1.3 to 4 mils, or from 1.4 to 3.5 mils, or from 1.3 to 1.7 mils, or from 2 to 4 mils, or from 2.5 to 3 mils, or from 1.2 to 4 mils.

In an embodiment, the polyester having a melt point of at least 240° C. makes up from 25 to 80 volume % of the film, or from 25 to 70 volume % of the film, or from 25 to 60 volume % of the film, or from 25 to 50 volume % of the film, or from 27 to 49 volume % of the film, or from 28 to 47 volume % of the film, or from 29 to 46 volume % of the film.

In an embodiment, the multilayer heat shrinkable film has a total free shrink at 85° C. of from 10% to 130%, measured in accordance with a modified free shrink test otherwise in accordance with ASTM D 2732, or a total free shrink at 85° C. of from 20% to 100%, or a total free shrink at 85° C. of from 70% to 110%, or a total free shrink at 85° C. of from 30% to 90%, or a total free shrink at 85° C. of from 40% to 80%, or a total free shrink of at least 15% at 85° C., or a total free shrink of at least 20% at 85° C., or a total free shrink of at least 30% at 85° C., or a total free shrink of at least 40% at 85° C., or a total free shrink of at least 50% at 85° C.

In an embodiment, the multilayer film does not exhibit visible delamination upon undergoing unrestrained free shrink upon immersion in water at 85° C. for 8 seconds, using ASTM D 2736.

In an embodiment, the film exhibits a total free shrink at 85° C. of at least 30% measured in accordance with the modified free shrink test otherwise in accordance with ASTM D 2732, and the first polyester is present in the film in an amount of at least 15 vol %, based on total film volume.

In an embodiment, the multilayer, heat-shrinkable film exhibits a total free shrink at 85° C. of from 40% to 90% measured in accordance with the modified free shrink test otherwise in accordance with ASTM D 2732, and the first polyester is present in the film in an amount of at least 20 vol %, based on total film volume.

In an embodiment, the multilayer film exhibits a shrink stress of at least 3.1 MPa measured in accordance with ASTM D2838-09, or at least 3.5 MPa, or at least 4 MPa, or at least 5 MPa, measured in accordance with ASTM D2838-09.

In an embodiment, the multilayer, heat-shrinkable film further comprises a fourth layer which is a second outer layer and which serves as a heat seal layer and which comprises at least one member selected from the group consisting of polyolefin, polyamide, polyester, polyvinyl chloride, and ionomer resin.

In an embodiment, the heat seal layer comprises at least one member selected from the group consisting of, polyolefin, polyamide 6/12, polyamide 12, ionomer resin, ethylene/unsaturated acid copolymer, ethylene/unsaturated ester copolymer, polyester having melting point of up to 150° C., homogeneous ethylene/alpha-olefin copolymer, heterogeneous ethylene/alpha-olefin copolymer, ethylene homopolymer, ethylene/vinyl acetate copolymer, and ionomer resin.

In an embodiment, the heat seal layer makes up from 5 to 40 volume percent, based on total film volume, or from 10 to 30 volume percent, or from 15 to 25 volume percent, or from 10 to 60 volume percent, based on total film volume, or from 15 to 55 volume percent, or from 17 to 50 volume percent, or from 19 to 46 volume percent, based on total film volume.

In an embodiment, the heat seal layer further comprises a slip agent and an antiblock agent.

In an embodiment, the heat seal layer comprises a blend of a homogeneous ethylene/alpha-olefin copolymer (e.g., having a density of from 0.89 to 0.91 g/cm$^3$) and a heterogeneous ethylene/alpha-olefin copolymer (e.g., LLDPE).

In an embodiment, the heat seal layer comprises a blend of from 75 to 90 wt % homogeneous ethylene/alpha-olefin copolymer having a density of from 0.895 to 0.905 g/cm$^3$, and from 10 to 25 wt % of a heterogeneous ethylene/alpha-olefin copolymer having a density of from 0.915 to 0.925 g/cm$^3$.

In an embodiment, the third layer is a first third layer and the multilayer heat-shrinkable film further comprises a fifth layer which is between the fourth layer and the second layer, the fifth layer serving as a second tie layer, the fifth layer comprising at least one member selected from the group consisting of modified polyolefin, modified ethylene/unsaturated acid copolymer, modified ethylene/unsaturated ester copolymer, and polyurethane. In an embodiment, the second tie layer can comprise an anhydride modified linear low density polyethylene.

In an embodiment, the second tie layer comprises a blend of from 50 to 85 wt % of a modified ethylene/alpha-olefin copolymer with from 50 to 15 wt % of modified ethylene/vinyl acetate copolymer having a vinyl acetate content of from 6 to 15 wt %.

In an embodiment, the multilayer heat shrinkable film further comprises a sixth layer which is between the second layer and the fifth layer, the sixth layer comprising at least one member selected from the group consisting of (i) an amorphous polyamide, (ii) a blend of a semicrystalline polyamide and amorphous polyamide, and (iii) a blend of polyamide 6/12 and a different semi-crystalline polyamide. The sixth layer provides the multilayer heat shrinkable film with additional impact strength and toughness.

In an embodiment, the sixth layer comprises a blend of amorphous polyamide and polyamide 6, or a blend of amorphous polyamide and polyamide 6/66.

In an embodiment, the sixth layer comprises a blend (i) from 60 to 95 wt % of at least one member selected from the group consisting of polyamide 6 and polyamide 6/66, and (ii) from 5 to 40 wt % of polyamide 6I/6T.

In an embodiment, the sixth layer makes up from 1 to 40 percent of the total film thickness, or from 3 to 20 percent of the total film thickness, or from 3-10 percent of the total film thickness, or from 4 to 6 percent of the total film thickness.

In an embodiment, the sixth layer comprises a blend of polyamide 6/66 or polyamide 6 and polyamide 6I/6T. The blend can comprise from 50 to 95 wt polyamide 6/66 or polyamide 6 and from 5 to 50 wt % polyamide 6I/6T, or from 60 to 95 wt % polyamide 6/66 or polyamide 6 and from 5 to 40 wt % polyamide 6I/6T, or from 70 to 95 wt polyamide 6/66 or polyamide 6 and from 5 to 30 wt % polyamide 6I/6T, or from 80 to 95 wt % polyamide 6/66 or polyamide 6 and from 5 to 20 wt % polyamide 6I/6T, or from 85 to 95 wt % polyamide 6/66 or polyamide 6 and from 5 to 15 wt % polyamide 6I/6T.

In an embodiment, film contains polyamide in an amount less than 10 weight percent, based on total film weight, based on total film weight, or in an amount less than 9 weight percent, or in an amount less than 8 weight percent, or in an amount less than 7 weight percent, or in an amount less than 6 weight percent, or in an amount from 1 to 6 weight percent, based on total film weight.

In an embodiment, film does not contain polyamide.

In an embodiment, the film does not comprise an internal layer comprising polyamide.

In an embodiment, the film does not comprise an outer layer comprising polyamide.

In an embodiment, the third layer is the only layer in the film comprising a styrene based polymer.

In an embodiment, the film has only one layer comprising a styrene-based polymer.

In an embodiment, the multilayer heat shrinkable film further comprises a supplemental tie layer between the second layer and the third layer, with the supplemental tie layer comprising at least one member selected from the group consisting of modified polyolefin, modified acid copolymer, modified ester copolymer, and polyurethane.

In an embodiment, the supplemental tie layer comprises a blend of from 50 to 85 wt % of a modified ethylene/alpha-olefin copolymer with from 50 to 15 wt % of modified ethylene/vinyl acetate copolymer having a vinyl acetate content of from 6 to 15 wt %. In an embodiment, the supplemental tie layer is directly adhered to the third layer and directly adhered to the second layer.

In an embodiment, the supplemental tie layer comprises at least one member selected from the group consisting of modified ethylene/alpha-olefin copolymer, modified ethylene/unsaturated ester copolymer, and modified ethylene/unsaturated acid copolymer.

In an embodiment, the modified polyolefin comprises anhydride modified linear low density polyethylene. The anhydride modified linear low density polyethylene can make up at least 80 weight % of the supplemental tie layer, or at least 90 weight % of the supplemental tie layer, or at least 95 weight % of the supplemental tie layer, or 100 weight % of the supplemental tie layer.

In an embodiment, the multilayer heat shrinkable film is a seamless tubing having a lay-flat width of from 40 to 1000 millimeters, a thickness of from 1 to 2 mils, and a total free shrink at 85° C. of from 40% to 90% measured in accordance with a modified free shrink test otherwise in accordance with ASTM D 2732.

In an embodiment, the multilayer heat shrinkable film is a seamless tubing having a lay-flat width of from 300 to 1000 millimeters, a thickness of from 2 to 5 mils, and a total free shrink at 85° C. of from 40% to 90% measured in accordance with a modified free shrink test otherwise in accordance with ASTM D 2732.

A second aspect is directed to a packaging article comprising a multilayer heat shrinkable film heat sealed to itself. The multilayer film is in accordance with the first aspect, described above, as well as any and all combinations of non-conflicting embodiments of the first aspect, described above. The packaging article is a member selected from the group consisting of end-seal bag, side-seal bag, L-seal bag, backseamed bag, and pouch.

A third aspect is directed to a packaging process comprising: (a) providing a strand of a flat, heat-shrinkable, multilayer film in accordance with the first aspect, described above (as well as any and all combinations of non-conflicting embodiments of the first aspect, described above), (b) utilizing the film in a flow wrap process to produce a partially packaged product comprising a backseamed packaging article having a bottom seal and an open top, the packaging article having a product therein, (c) evacuating atmosphere from within the packaging article and sealing the open top of the packaging article closed so that the product is surrounded by the packaging article, and (d) shrinking the packaging article around the product.

In an embodiment, the process is carried out intermittently, and the packaging article has a first portion of the backseam made before process interruption and a second portion of the backseam made after process interruption, and the packaging article has a burst strength as high as the burst strength of a corresponding package in which the entire backseam was continuously produced without interruption.

In an embodiment, the process is carried out intermittently, and the packaging article has a first portion of the backseam made before process interruption and a second portion of the backseam made after process interruption, and the packaging article has a burst strength at least 95 percent as high as the burst strength of a corresponding package in which the entire backseam was continuously produced without interruption, or at least 90 percent as high, or at least 85 percent as high, or at least 80 percent as high, or at least 75 percent as high, or at least 70 percent as high, as the burst strength of a corresponding package in which the entire backseam was continuously produced without interruption.

A fourth aspect is directed to a process for making a heat-shrinkable annular film, comprising: (I) coextruding an annular multilayer extrudate downward from an annular die, (II) quenching the annular extrudate by applying a quenching liquid to the annular extrudate, (III) reheating the extrudate to an orientation temperature of from 54° C. to 99° C., resulting in a reheated annular extrudate, and (IV) orienting the reheated annular extrudate while the reheated annular extrudate is in the solid state, the orientation being carried out with a total orientation factor of at least 2, so that an oriented, multilayer, heat-shrinkable film is produced. The coextruded annular extrudate comprises: (a) a first layer comprising a first polyester, the first layer being an outer layer, (b) a second layer which serves as an $O_2$-barrier layer, the second layer comprising at least one member selected from the group consisting of saponified ethylene/vinyl acetate copolymer, polyamide MXD6, polyamide 6I/6T, polyamide 6, polyvinylidene chloride, polyethylene naphthalate, polytrimethylene terephthalate, liquid crystal polymer, and $O_2$-scavenger, and (c) a third layer between the first layer and the second layer, the third layer serving as a tie layer, the third layer comprising at least one styrene-based copolymer. The orientation is carried out so that the oriented, multilayer heat-shrinkable film exhibits a total free shrink at 85° C. of at least 10 percent measured in accordance with a modified free shrink test otherwise in accordance with ASTM D 2732, and the first polyester is present in the film in an amount of at least 2 volume %, based on total film volume. The process can be carried out so that the oriented, multilayer heat-shrinkable film is in accordance with the first aspect, described above, including any and all combinations of non-conflicting embodiments of the first aspect, described above.

In an embodiment, the quenching liquid absorbs heat from the annular extrudate as at least 50% of the quenching liquid cascades down the annular extrudate for a distance of at least 2 inches, and quenching liquid making initial contact with the annular extrudate at a distance of from 0.1 to 8 inches downstream of a point at which the annular extrudate emerges from the annular die. This process can be carried out as illustrated in FIG. 15, described below.

Alternatively, the process can be carried out as illustrated and described in U.S. Pat. No. 7,744,806, to Broadus et al, entitled "Process for Making Shrink Film Comprising Rapidly-Quenched Semi-Crystalline Polyamide," which is hereby incorporated, in its entirety, by reference thereto. See particularly the apparatus illustrated in FIGS. 2A, 2C, 3, and 4 thereof, and portions of specification describing same.

In an embodiment, the process further comprises annealing the multilayer heat-shrinkable film after it has been oriented in the solid state.

In an embodiment, all layers of the multilayer are simultaneously coextruded.

A fifth aspect is directed to a packaged product comprising a packaging article made from a multilayer heat shrinkable film and a product comprising food inside the package. The multilayer heat shrinkable film is in accordance with the first aspect, described above, including any and all combinations of non-conflicting embodiments of the first aspect described above.

A sixth aspect is directed to a multilayer heat-shrinkable film having (A) a first outer layer containing polyester, (B) a second outer layer which serves as a heat seal layer, (C) a first inner layer comprising a polyamide, and (D) a second inner layer which is between the first inner layer and the first outer layer and which serves as a tie layer to bond the first outer layer to the inner polyamide layer. The second inner layer comprises a blend of: (i) a first blend component comprising an anhydride-functional polyolefin; (ii) a second blend component comprising at least one member selected from the group consisting of styrene/maleic anhydride copolymer, anhydride-functional styrene-ethylene-butylene-styrene copolymer, anhydride-functional styrene-butadiene-styrene copolymer, anhydride functional styrene-isoprene-styrene copolymer, anhydride-functional styrene-ethylene-butadiene-styrene copolymer, and anhydride-functional grafted styrene-(ethylene-propylene rubber)-styrene copolymer; and (iii) a third blend component comprising a second polyester. The multilayer heat-shrinkable film exhibits a total free shrink at 85° C. of at least 10 percent measured in accordance with a modified free shrink test otherwise in accordance with ASTM D 2732. The first polyester is present in the film in an amount of at least 5 volume %, based on total film volume.

In an embodiment, the first inner layer comprises at least one member selected from the group consisting of: (a) a blend of a semi-crystalline polyamide and an amorphous polyamide; (b) a blend of a semi-crystalline polyamide and polyamide 6/12; and (c) 100% amorphous polyamide.

In an embodiment, the first blend component comprises an anhydride-functional ethylene/alpha-olefin copolymer, and the second blend component comprises anhydride-functional styrene/butadiene block copolymer.

In an embodiment, the third blend component comprises a semi-crystalline, thermoplastic, linear saturated polyester resin having a density of from 1.15 to 1.30 g/cm$^3$, a melting point of from 150° C. to 160° C., and a melt index of from 0.5 to 2 g/10 min.

In an embodiment, the first outer layer makes up from 5 to 20 volume % based on total film volume, the second outer layer makes up from 15 to 40 volume % based on total film volume, the first inner layer makes up from 10 to 30 volume % based on total film volume, and the second inner layer makes up from 10 to 30 volume % based on total film volume.

In an embodiment, the film has a total thickness of from 1.5 mils to 4 mils, or from 2 to 3.5 mils, or from 2.5 to 3 mils.

In an embodiment, the first blend component makes up from 30 to 80 wt % based on total layer weight, the second blend component makes up from 10 to 50 wt % based on total layer weight, and the third blend component makes up from 2 to 20 wt % based on total layer weight.

In an embodiment, the first blend component makes up from 40 to 70 wt % based on total layer weight, the second blend component makes up from 20 to 40 wt % based on total layer weight, and the third blend component makes up from 5 to 15 wt % based on total layer weight.

In an embodiment, the first polyester comprises polyethylene terephthalate having a melting point of at least 240° C.

In an embodiment, the second inner layer is directly adhered to both the first outer layer and the first inner layer.

In an embodiment, the film exhibits a total free shrink at 85° C. of at least 20 percent measured in accordance with a modified free shrink test (disclosed below) otherwise in accordance with ASTM D 2732; or at least 30 percent, or at least 40 percent, or at least 50 percent, or at least 55 percent, or at least 60 percent, in accordance with the modified free shrink test otherwise in accordance with ASTM D 2732.

In an embodiment, the second outer layer which serves as the heat seal layer comprises at least one member selected from the group consisting of polyolefin, polyamide 6/12, polyamide 12, ionomer resin, ethylene/unsaturated acid copolymer, ethylene/unsaturated ester copolymer, and polyester having melting point of up to 150° C.

In an embodiment, the heat seal layer further comprises a slip agent and an antiblock agent.

In an embodiment, the second outer layer comprises a homogeneous ethylene/alpha-olefin copolymer having a density of from 0.89 to 0.91 g/cm$^3$.

In an embodiment, the film further comprises (E) a third inner layer which serves as an $O_2$-barrier layer, the third inner layer comprising at least one member selected from the group consisting of saponified ethylene/vinyl acetate copolymer, polyamide MXD6, polyamide 6I/6T, polyamide 6, polyvinylidene chloride, polyethylene naphthalate, polytrimethylene terephthalate, liquid crystal polymer, and $O_2$-scavenger. The third inner layer is between the first inner layer and the second outer layer.

In an embodiment, the film further comprises (F) a fourth inner layer which serves as a second tie layer, the fourth inner layer being between the second outer layer and the third inner layer, and (G) a fifth inner layer between the third inner layer and the fourth inner layer, the fifth inner layer comprising a blend of at least one member selected from the group consisting of: (a) a blend of a semi-crystalline polyamide and an amorphous polyamide, (b) a blend of a semi-crystalline polyamide and polyamide 6/12, and (c) 100% amorphous polyamide.

In an embodiment, the first inner layer and the fifth inner layer have the same composition. In another embodiment, the first inner layer and the fifth inner layer have different compositions.

In an embodiment, the first inner layer and the fifth inner layer have the same thickness. In another embodiment, the first inner layer and the fifth inner layer have different.

In an embodiment the first inner layer and the fifth inner layer have the same composition and are the same thickness.

In an embodiment, the third inner layer, which is an $O_2$-barrier layer, is directly adhered to both the first inner layer and the fifth inner layer.

In an embodiment, the polyester in the first outer layer comprises polyethylene terephthalate copolymer in an amount of at least 95 wt %, based on total layer weight. In combination therewith, the second outer layer may comprise a blend of from 75 to 90 wt % homogeneous ethylene/alpha-olefin copolymer having a density of from 0.895 to 0.905 g/cm$^3$, and from 10 to 25 wt % of a heterogeneous ethylene/alpha-olefin copolymer having a density of from 0.915 to 0.925 g/cm$^3$. In combination therewith, the first inner layer may comprise a blend of (a) from 60 to 95 wt % of at least one member selected from the group consisting of polyamide 6 and polyamide 6/66, and (b) from 5 to 40 wt % of polyamide 6I/6T. In combination therewith, the second inner layer may comprise (i) from 50 to 70 wt % of an anhydride-functional ethylene/alpha-olefin copolymer, (ii) from 20 to 40 wt anhydride-functional styrene/butadiene block copolymer; and (iii) from 5 to 15 wt % polyester. In combination therewith, the third inner layer may comprise saponified ethylene vinyl acetate copolymer. In combination therewith, the fourth inner layer may comprise an anhydride-grafted ethylene/alpha-olefin copolymer. In combination therewith, the fifth inner layer may comprise a blend of (i) from 60 to 95 wt % of at least one member selected from the group consisting of polyamide 6 and polyamide 6/66, and (ii) from 5 to 40 wt % of polyamide 6I/6T.

In an embodiment, the first outer layer makes up from 5 to 15 volume % based on total film volume, the second outer layer makes up from 15 to 25 volume % based on total film volume, the first inner layer makes up from 10 to 20 volume % based on total film volume, the second inner layer makes up from 10 to 20 volume % based on total film volume, the third inner layer makes up from 2 to 10 volume % based on total film volume, the fourth inner layer makes up from 20 to 30 volume % based on total film volume, and the fifth inner layer makes up from 10 to 20 volume % based on total film volume.

A seventh aspect is directed to a process for making a fully coextruded, heat-shrinkable annular film. The process comprises (I) coextruding through an annular die film layers (A), (B), (C), and (D), i.e., the layers according to the sixth aspect, (II) quenching the extrudate, (III) reheating the extrudate, and (IV) orienting the extrudate. The quenching (II) of the annular extrudate is carried out by applying a quenching liquid to the annular extrudate. The reheating (III) of the extrudate is carried out by reheating the extrudate to an orientation temperature of from 130° F. to 210° F., resulting in a reheated annular extrudate. The orientation (IV) of the annular extrudate is carried out by orienting the reheated annular extrudate while the reheated annular extrudate is in the solid state, the orientation being carried out with a total orientation factor of at least 2, so that an oriented, multilayer, heat-shrinkable film is produced. The orientation is carried out so that the oriented, multilayer heat-shrinkable film exhibits a total free shrink at 85° C. of at least 40 percent measured in accordance with a modified free shrink test otherwise in accordance with ASTM D 2732. The first polyester is present in the film in an amount of at least 5 volume %, based on total film volume. The extrusion can be carried out in accordance with any of the embodiments of the sixth aspect described herein.

In an embodiment, the coextrusion can include layers (A), (B), (C), and (D) in combination with layer (E). In an alternative embodiment, the coextrusion can include layers (A), (B), (C), and (D) in combination with layers (E), (F), and (G).

In an embodiment, the orientation is carried out with a total orientation factor of at least 5, or at least 6, or at least 7, or at least 8. The total orientation factor is the orientation factor in the machine direction multiplied by the orientation factor in the transverse direction. For example, if the reheated extrudate is stretched 2.5× in the machine direction and 2.7× in the transverse direction, the total orientation factor is about 6.75×.

In an embodiment, the quenching liquid absorbs heat from the annular extrudate as at least 50% of the quenching liquid cascades down the annular extrudate for a distance of at least 2 inches, with the quenching liquid making initial contact with the annular extrudate at a distance of from 0.1 to 8 inches downstream of a point at which the annular extrudate emerges from the annular die.

An eighth aspect is directed to a packaging process comprising: (A) providing a strand of a flat, heat-shrinkable, multilayer film in accordance the sixth aspect, described above; (B) utilizing the film in a flow wrap process to produce a partially packaged product comprising a backseamed packaging article having a bottom seal and an open top, the packaging article having a product therein; (C) evacuating atmosphere from within the packaging article and sealing the open top of the packaging article closed so that the product is surrounded by the packaging article; and (D) shrinking the packaging article around the product.

In an embodiment, the process is carried out intermittently, and the packaging article has a first portion of the backseam made before process interruption and a second portion of the backseam made after process interruption.

A ninth aspect is directed to a packaging article made from a film according to the sixth aspect. The packaging article is a member selected from the group consisting of end-seal bag, side-seal bag, L-seal bag, and pouch.

A tenth aspect is directed to a packaged product comprising a packaging article made from a film according to the sixth aspect. The packaging article surrounds a product comprising food. In an embodiment, the packaging article is in accordance with the ninth aspect.

THE BRIEF DESCRIPTION OF THE DRAWINGS

FIG. 8 is a schematic plan view of a backseamed bag having a fin-type backseam.

FIG. 9 is a transverse cross-sectional view of the backseamed bag of FIG. 8.

FIG. 16 is a schematic of horizontal flow wrap process for packaging products using a heat shrinkable film in accordance with the invention.

DETAILED DESCRIPTION

Figure 1:
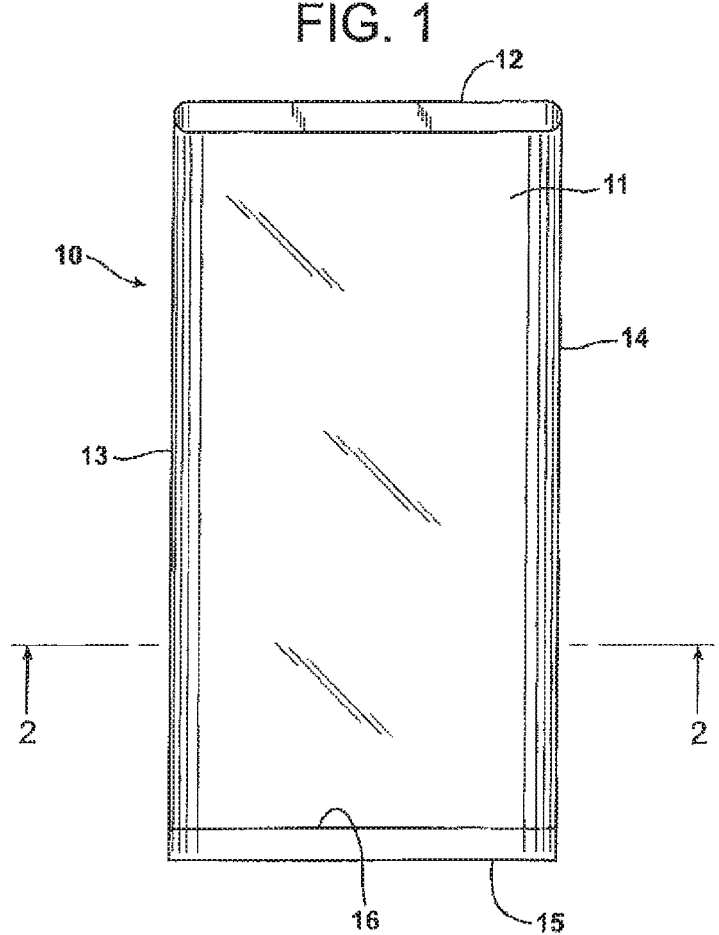
FIG. 1 is a schematic plan view of an end-seal bag.

As used herein, the term "film" is used in a generic sense to include plastic web, regardless of whether it is film or sheet. Preferably, films of and used in the present invention have a thickness of 0.25 mm or less. The film can have any total thickness desired, so long as the film provides the desired properties for the particular packaging operation in which the film is used.

As used herein, the term "package" refers to packaging materials used in the packaging of a product, as well as the form that the film has been placed into in the preparation of the packaging article that partially or fully surrounds the product inside. As used herein, the phrase "packaged product" refers to the package having the product therein.

As used herein, the phrases "seal layer", "sealing layer", "heat seal layer", and "sealant layer", refer to an outer layer, or layers, involved in the sealing of the film to itself, another layer of the same or another film, and/or another article which is not a film. Although it should also be recognized that up to the outer 3 mils of a film can be involved in the sealing of the film to itself or another layer, the phrase "seal layer," and the like, refer herein only to the outer layer(s) which is to be heat-sealed to itself, another film, etc. Any inner layers which contribute to the sealing performance of the film are herein designated as "seal-assist" layers. With respect to packages having only fin-type seals, as opposed to lap-type seals, the phrase "sealant layer" generally refers to the inside layer of a package, the inside layer being an outer layer which frequently also serves as a food contact layer in the packaging of foods Sealant layers employed in the packaging arts have included the genus of thermoplastic polymer, which includes thermoplastic polyolefin, polyamide, polyester, polyvinyl chloride, and ionomer resin. For low temperature end use, preferred polymers for the sealant layer include low melt point polymers such as homogeneous ethylene/alpha-olefin copolymer, heterogeneous ethylene/alpha-olefin copolymer, ethylene homopolymer, ethylene/vinyl acetate copolymer, and ionomer resin.

As used herein, the term "heat-seal," and the phrase "heat-sealing," refer to any seal of a first region of a film surface to a second region of a film surface, wherein the seal is formed by heating the regions to at least their respective seal initiation temperatures. The heating can be performed by any one or more of a wide variety of manners, such as using a heated bar, hot wire, hot air, infrared radiation, ultrasonic sealing, etc. Heat-sealing is the process of joining two or more thermoplastic films or sheets by heating areas in contact with each other to the temperature at which fusion occurs, usually aided by pressure. Heat-sealing is inclusive of thermal sealing, melt-bead sealing, impulse sealing, dielectric sealing, and ultrasonic sealing.

As used herein, the term "barrier," and the phrase "barrier layer," as applied to films and/or layers, is used with reference to the ability of a film or layer to serve as a barrier to one or more gases. The phrase "thermoplastic oxygen barrier" refers to any thermoplastic polymeric material which controls the oxygen permeability of the entire film. In a multilayer oxygen barrier film, the layer providing the lowest oxygen transmission rate (OTR) controls the oxygen barrier property of the entire film. For perishable food packaging applications, the OTR should be minimized.

In the packaging arts, oxygen barrier layers (i.e., $O_2$ barrier layers) layers can include, for example, saponified ethylene/vinyl acetate copolymer (also referred to as ethylene/vinyl alcohol copolymer, i.e., EVOH), polyvinylidene chloride (PVDC), polyalkylene carbonate, polyamide, polyethylene naphthalate, polyester, polyacrylonitrile, etc., as known to those of skill in the art. In the film of the present invention, the $O_2$-barrier layer preferably comprises either EVOH or polyvinylidene chloride. PVDC can comprise a thermal stabilizer (i.e., HCl scavenger, e.g., epoxidized soybean oil) and a lubricating processing aid, which, for example, comprises one or more acrylates.

The phrase "oxygen transmission rate" ("OTR") is defined herein as the amount of oxygen ($O_2$) in cubic centimeters ($cm^3$) which will pass through a 100 square inches of film in 24 hours at 0% relative humidity and at 23° C. The thickness (gauge) of the $O_2$-barrier layer has a direct relationship on the oxygen transmission rate. Packaging films which are useful as an oxygen barrier are required to have an OTR value of from about 0 to 10.0 $cm^3/100$ $in^2$ over 24 hr at 0% relative humidity and 23° C. at 1.0 mils or less. OTR can be measured according to ASTM D-3985-81, which is incorporated herein by reference.

In all of the aspects and embodiments set forth above, the thermoplastic oxygen barrier of the film may include, but is not limited to, ethylene/vinyl alcohol copolymer, polyamide, polyvinylidene chloride, and blends thereof. The thermoplastic oxygen barrier may be a blend of polyamides. The oxygen barrier layer may include a polyamide blend of between about 85 wt % of a polyamide selected from the group consisting of nylon 4,6 (polytetramethylene adipamide), nylon 6 (polycaprolactam), nylon 6,6 (polyhexamethylene adipamide), nylon 6,9 (polyhexamethylene nonanediamide), nylon 6,10 (polyhexamethylene sebacamide), nylon 6,12 (polyhexamethylene dodecanediamide), nylon 6/12 copolymer (polycaprolactam/dodecanediamide), nylon 6,6/6 copolymer (polyhexamethylene adipamide/caprolactam), nylon 11 (polyundecanolactam), nylon 12 (polyauryllactam) or blends thereof, and about 15 wt % of an amorphous polyamide.

As used herein, the phrase "ethylene/vinyl alcohol copolymer" or EVOH, refers to polymerized ethylene vinyl alcohol. Ethylene/vinyl alcohol copolymer is saponified or hydrolyzed ethylene/vinyl acrylate copolymer. In all of the aspects and embodiments set forth above, the degree of hydrolysis can be at least 50%, or at least 85%. The ethylene/vinyl alcohol copolymer can comprise from about 28 to 48 mole % ethylene, or from about 32 to 44 mole % ethylene, or from about 38 to 44 mole % ethylene.

As used herein, the phrase "tie layer" refers to any internal layer having the primary purpose of adhering two film layers to one another. Tie layers can be used to adhere the barrier layer (such as EVOH) to a polyolefin heat seal layer, or to adhere a polyamide layer to a polyolefin layer. Such tie layers can comprise any polymer having a polar group grafted thereon. Polymers for use in tie layers for bonding polyolefin to polyamide or EVOH include, but are not limited to: modified and unmodified ethylene/unsaturated acid copolymer, modified and unmodified ethylene/unsaturated ester copolymer, anhydride-grafted polyolefin, polyurethane, modified and unmodified acrylate based polymer, and mixtures thereof.

Tie layers for bonding polyester to EVOH or PVDC or polyamide or polyolefin include: modified or unmodified styrene-based polymers alone or in blends with unsaturated ester copolymer (particularly unsaturated acrylate copolymer) and/or cyclic olefin copolymer and optionally further blended with anhydride modified polyolefin and/or polyester.

As used herein, the term "adhesive" refers to a polymeric material serving a primary purpose or function of adhering two surfaces to one another. In the present invention, the adhesive may adhere one film layer surface to another film layer surface or one area of a film layer surface to another area of the same film layer surface. The adhesive may comprise any polymer, copolymer or blend of polymers having a polar group thereon, or any other polymer, homopolymer, copolymer or blend of polymers including modified and unmodified polymers, e.g., grafted copolymers, which provide sufficient interlayer adhesion to adjacent layers comprising otherwise nonadhering polymers. Adhesive compositions of the present invention may include, but are not limited to, modified and unmodified polyolefins, including homopolymers and copolymers of ethylene, ethylene/α-olefin copolymer, modified and unmodified acrylate copolymers such as ethylene/vinyl acrylate copolymer, ethylene/methyl acrylate copolymer, ethylene/butyl acrylate copolymer, ethylene/ethyl acrylate, or blends thereof.

As used herein, the term "adhered" is inclusive of films which are directly adhered to one another using a heat-seal or other means, as well as films which are adhered to one another using an adhesive which is between the two films. As used herein, the phrase "directly adhered", as applied to layers, is defined as adhesion of the subject layer to the object layer, without a tie layer, adhesive, or other layer therebetween. In contrast, as used herein, the word "between", as applied to a layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the phrases "anhydride functional polymer" and "modified polymer", as well as more specific phrases such as "modified ethylene/vinyl acetate copolymer," "modified polyolefin," and "anhydride functional styrene copolymer" refer to such polymers as have an anhydride functionality associated therewith, regardless of whether the anhydride functionality is grafted thereon and/or copolymerized therewith and/or blended therewith. Modified polymers can have the anhydride functionality grafted on or polymerized therewith, as opposed to merely blended therewith.

As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom.

The anhydride functionality can be an anhydride of maleic acid, crotonic acid, citraconic acid, itaconic acid, fumaric acid, etc., and is inclusive of derivatives of such functionalities, such as acids, esters, and metal salts derived therefrom. As used herein, the phrase "anhydride-containing polymer" and "anhydride-modified polymer", refer to one or more of the following: (i) polymers obtained by copolymerizing an anhydride-containing monomer with a second, different monomer, and (ii) anhydride grafted copolymers, and (iii) a mixture of a polymer and an anhydride-containing compound.

As used herein, the phrase "acrylate-based resin" refers to homopolymers, copolymers, including e.g. bipolymers, terpolymers, etc., having an acrylate moiety in at least one of the repeating units (i.e., "mer" units) forming the backbone of the polymer. Acrylate-based resins include polyalkyl acrylates. Acrylate-based resins can be prepared by any method known to those skill in the art. Suitable examples of these resins for use in the present invention include ethylene/vinyl acrylate copolymers (EVA), ethylene/methacrylate copolymers (EMA), ethylene/butyl acrylate copolymers (EBA), and the like.

As used herein, the phrase "styrene-based polymer" refers to at least one polymer selected from the group consisting of styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer. As used herein, the phrase "styrene-based polymer" includes anhydride modified copolymers of all styrene-based polymers identified herein. Unless otherwise indicated, as used herein the use of a "dash" (i.e., the "-") in a styrene-based polymer formula, is inclusive of both block copolymers and random copolymers. More particularly, the phrase "styrene-based polymer" includes both copolymers in which (i) all named monomers are present as a block, or (ii) any subset of the named monomers are present as a block with the remaining monomers being randomly arranged, or (iii) all named monomers are randomly arranged.

Styrene-based polymers include hydrogenated block copolymers including: (a) polystyrene-poly(ethylene-propylene) diblock copolymer, e.g., KRATON G1701 and G1702 from Kraton Polymers; (b) polystyrene-poly(ethylene-butylene)-polystyrene triblock copolymer, e.g., KRATON G1641, G1650, G1651, G1654, G1657, G1726, G4609, G4610, GRP-6598, RP-6924, MID-6932M, MID-6933, and MID-6939 from Kraton Polymers; (c) polystyrene-poly(ethylene-butylene-styrene)-polystyrene (S-EB/S-S) triblock copolymer, e.g., KRATON RP-6935 and RP-6936 from Kraton Polymers; (d) polystyrene-poly(ethylene-propylene)-polystyrene triblock copolymer, e.g., KRATON G1730 from Kraton Polymers; (e) maleic anhydride-grafted polystyrene-poly(ethylene-butylene)-polystyrene triblock copolymer, e.g., KRATON G1901, G1924, and MD-6684, from Kraton Polymers; and (f) maleic anhydride-grafted polystyrene-poly(ethylene-butylene-styrene)-polystyrene triblock copolymer, e.g., KRATON MID-6670 from Kraton Polymers.

Further styrene-based hydrogenated block copolymers include: (g) polystyrene-poly(ethylene-butylene)-polystyrene triblock copolymer, such as polystyrene-poly(ethylene-butylene)-polystyrene triblock copolymer comprising 67 weight percent polystyrene available from Asahi Kasei Elastomer as TUFTEC H1043; (h) polystyrene-poly(ethylene-butylene)-polystyrene triblock copolymer, such as polystyrene-poly(ethylene-butylene)-polystyrene triblock copolymer comprising 42 weight percent polystyrene available from Asahi Kasei Elastomer as TUFTEC H1051; (i) polystyrene-poly(butadiene-butylene)-polystyrene triblock copolymer, such as TUFTEC P1000 and P2000 from Asahi Kasei Elastomer as; (j) polystyrene-polybutadiene-poly(styrene-butadiene)-polystyrene block copolymer, such as S.O.E.-SS L601 from Asahi Kasei Elastomer as S.O.E.-SS L601; (k) hydrogenated radial block copolymer, such as K-Resin KK38, KR01, KR03, and KR05 from Chevron Phillips Chemical Company as; (l) polystyrene-poly(ethylene-butylene)-polystyrene triblock copolymer, such as polystyrene-poly(ethylene-butylene)-polystyrene triblock copolymer comprising 60 weight polystyrene available from Kuraray as SEPTON 58104; (m) polystyrene-poly(ethylene-ethylene/propylene)-polystyrene triblock copolymer, such as SEPTON S4044, S4055, S4077, and S4099 from Kuraray; (n) polystyrene-poly(ethylene-propylene)-polystyrene triblock copolymer, such as polystyrene-poly(ethylene-propylene)-polystyrene triblock copolymer comprising 65 weight percent polystyrene available from Kuraray as SEPTON S2104. Mixtures of two of more hydrogenated block copolymers can be used.

As used herein, the phrase "compatibilizing layer" refers to a film layer that has its first principal surface directly adhered to a primary layer, with its second principal surface offering greater bond strength for direct bonding with a tertiary layer than if the tertiary layer was to be directly bonded to the primary layer. A compatibilizing layer is present in many of the films of Table 2 below. The compatibilizing layer contains a blend of 90% polyamide 6/66 and 10% polyamide 6I/6T. A first principal surface of the compatibilizing layer is directly adhered to the barrier layer, which is EVOH in the films of Table 2. The second principal surface of the compatibilizing layer is directly adhered to a tie layer made from a modified linear low density polyethylene. The bond between the modified linear low density polyethylene and the polyamide blend is stronger than the bond strength that would have been present if the modified linear low density polyethylene was bonded to the EVOH. As such, the compatibilizing layer enhances the interlaminar strength within the multilayer film, but need not be a thick layer, as its compatibilizing advantage is based on chemistry, not bulk.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is usually obtained by "blowing" the film to produce a bubble. For such films, drawing is usually obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrases "heat-shrinkable," "heat-shrink," and the like, refer to the tendency of a film, generally an oriented film, to shrink upon the application of heat, i.e., to contract upon being heated, such that the size (area) of the film decreases while the film is in an unrestrained state. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained).

As used herein, the phrase "free shrink" refers to the percent dimensional change in a 10 cm. by 10 cm. specimen of film, when subjected to selected heat (i.e., at a certain temperature), with the quantitative determination being carried out according to ASTM D 2732, as set forth in the 1990 Annual Book of ASTM Standards, Vol. 08.02, pages 368-371, which is hereby incorporated, in its entirety, by reference thereto. As used herein, the phrase "@STP" refers to the test being carried out under standardized test conditions, i.e., one atmosphere of pressure, 23° C., and 0% relative humidity.

Although the above free shrink test disclosed above is a standard ASTM free shrink test for use in assessing the degree of shrinkage exhibited by a heat shrinkable film, the free shrink of the films of the Table 2, and the free shrink values recited in the claims below, were measured by a "a modified free shrink test otherwise in accordance with ASTM D2732." The modified test was carried out because of the tendency of the film to curl during the free shrink test, making measurement difficult due to difficulty of measuring the uncurled film sample after shrinking.

The modified free shrink test otherwise in accordance with ASTM D2732 was carried out by marking a sample with a 10 cm by 10 cm square and then cutting the sample so that the entire sample had a 25 mm border outside of the 10 cm marking. That is, the sample was 15 cm by 15 cm with the central 10 cm by 10 cm being marked out before shrinking. The shrinking was carried out otherwise in accordance with ASTM D2732, except that percent free shrink in each direction was calculated by measuring the marked area after shrinking, rather than measuring the full sample dimensions after shrinking. In all other regards, the actual shrinking of the sample was conducted as per ASTM D2732, but the shrink measurement was made by measuring the marking after shrinking, with the excess film being utilized to hold the film during unrolling, so that the film could be held flat for the post-shrink measurement to be taken.

As used herein, the phrase "heat-shrinkable" is used with reference to all films which exhibit a total free shrink (i.e., L+T) of at least 10 percent at 85° C.

"Total free shrink" is determined by summing the percent free shrink in the machine direction with the percentage of free shrink in the transverse direction. For example, a film which exhibits, at 85° C., 30 percent free shrink in the transverse direction and 20 percent free shrink in the machine direction, has a "total free shrink" at 85° C. of 50 percent.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. A film layer can consist of a single polymer (with or without non-polymeric additives), or can have still additional polymers together therewith, i.e., blended therewith.

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term copolymer is also inclusive of polymers produced by reaction, such as graft copolymer, block copolymer, and random copolymer.

As used herein, the term "polymerization" is inclusive of homopolymerizations, copolymerizations, terpolymerizations, etc., and includes all types of copolymerizations such as random, graft, block, etc. Polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers to result in a copolymer. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

For addition polymers, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mers" derived from the monomers from which the copolymer is produced, e.g., a propylene/ethylene copolymer comprises propylene mer units and ethylene mer units.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the term "polyester" refers to homopolymers or copolymers having an ester linkage between monomer units which may be formed, for example, by condensation polymerization reactions between a dicarboxylic acid and a glycol. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, e.g., various isomers of phthalic acid (i.e., ortho-phthalic acid), such as isophthalic acid (i.e., meta-phthalic acid), and terephthalic acid (i.e., para-phthalic acid), as well as naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The dicarboxylic acid can alternatively be 2,5-furandicarboxylic acid (FDCA). The glycols may be straight-chained or branched. Specific examples include ethylene glycol, propylene glycol, trimethylene glycol, 1,4-butane diol, neopentyl glycol and the like. The glycols include modified glycols such as cyclohexane dimethanol. The polyester in the outer layer of the film can comprise any of the above polyesters. The first layer can comprise polyethylene terephthalate copolymer, polybutylene terephthalate, polynaphthalene terephthalate, and/or polyethylene furanoate, any of which can be biaxially-oriented. As used herein, the term "polyester" is inclusive of both polyethylene terephthalate homopolymer as well as copolymers thereof.

In an embodiment the outer layer comprises polyethylene furanoate. Avantium® bio-based polyester is a polyethylene furanoate which per unit thickness exhibits only one tenth the oxygen transmission rate of polyethylene terephthalate (PET); one fourth the carbon dioxide transmission rate of PET, and one half the water vapor transmission rate of PET. Polyethylene furanoate is more heat resistant than PET ($T_g$ 12° C. higher than PET. Furthermore, polyethylene furanoate is recyclable alone or in a blend with PET. Polyethylene furanoate can be extruded to form films. Polyethylene furanoate is made by polymerizing ethylene glycol and 2,5-furandicarboxylic acid (FDCA). Polyethylene furanoate renewable because it is bio-based.

As used herein, the term "polyamide" refers to homopolymers, copolymers, or terpolymers having an amide linkage between monomer units which may be formed by any method known to those skill in the art. Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/9/6 copolymer (polyhexamethylene adipamide/hexamethylene azelaiamide/caprolactam copolymer), as well as other nylons which are not particularly delineated here. Additional polyamides include nylon 4,1, nylon 6,1, nylon 6,6/6I copolymer, nylon 6,6/6T copolymer, MXD6 (poly-m-xylylene adipamide), nylon 6T/6I copolymer, nylon 6/MXDT/I copolymer, nylon MXDI, poly-p-xylylene adipamide, polyhexamethylene terephthalamide, polydodecamethylene terephthalamide and the like.

The multilayer heat shrinkable film can have a polyamide layer made up of any one or more of the polyamides in the paragraph above. Moreover, the polyamide can be blended with another polymer, such as ionomer resin, polyether block amide copolymer (e.g., PEBAX® polyether block amide), maleic anhydride grafted polymer (e.g., grafted ethylene acrylate carbon monoxide terpolymer, grafted ethylene vinyl acetate, grafted heterogeneous polyethylene, grafted homogeneous (e.g., metallocene catalyzed) polyethylene, grafted ethylene propylene rubber, and grafted polypropylene, grafted styrene butadiene copolymer, and grafted styrene ethylene butylene styrene copolymer. Moreover, the polyamide or polyamide blend can make up at least 60 wt % of the layer, based on layer weight, or at least 80 wt % based on layer weight, or at least 90 wt % based on layer weight, or at least 95 wt % based on layer weight, or 100 wt % based on layer weight.

As used herein, the phrase "amorphous polyamide" refers to polyamides or nylons with an absence of a regular three-dimensional arrangement of molecules or subunits of molecules extending over distances, which are large relative to atomic dimensions. However, regularity of structure exists on a local scale. See, "Amorphous Polymers," in *Encyclopedia of Polymer Science and Engineering*, 2nd Ed., pp. 789-842 (J. Wiley & Sons, Inc. 1985). This document has a Library of Congress Catalogue Card Number of 84-19713. In particular, the term "amorphous polyamide"

refers to a material recognized by one skilled in the art of differential scanning calorimetry (DSC) as having no measurable melting point (less than 0.5 cal/g) or no heat of fusion as measured by DSC using ASTM 3417-83. Such nylons include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons. As used herein, the phrase "amorphous polyamide" includes (i) the copolymer of hexamethylene diamine and isophthalic acid and terphthalic acid, i.e., polyamide 6I6T, and (ii) the homopolymer of meta-xylene diamine and adipic acid, i.e., polyamide MXD6.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER™ linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally have an $M_w/M_n$ of less than 2.7; preferably from about 1.9 to about 2.5; more preferably, from about 1.9 to about 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., J. Poly. Sci. Poly. Phys. Ed., Vol. 20, p. 441 (1982). Preferably, the homogeneous ethylene/alpha-olefin copolymers have a CDBI greater than about 70%, i.e., a CDBI of from about 70% to about 99%. The homogeneous ethylene/alpha-olefin copolymers in the multilayer films to be used in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Calorimetry (DSC), of from about 60° C. to about 105° C. Preferably the homogeneous copolymer has a DSC peak $T_m$ of from about 80° C. to about 100° C. As used herein, the phrase "essentially single melting point" means that at least about 80%, by weight, of the material corresponds to a single $T_m$ peak at a temperature within the range of from about 60° C. to about 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can be prepared by the copolymerization of ethylene and any one or more alpha-olefins. Preferably, the alpha-olefin is a $C_{3-20}$ α-monoolefin, more preferably, a $C_{4-12}$ α-monoolefin, still more preferably, a $C_{4-8}$ α-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer, including modified polymers such as anhydride modified polymers. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "cyclic polymer" includes cyclic olefin copolymer, whether aliphatic or phenolic, i.e., including ethylene/norbornene copolymer, polycyclododecene, polyester, and cyclic olefin polymer.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, ethylene/propylene copolymer, propylene/alpha-olefin copolymer, butene/alpha-olefin copolymer, low density polyethylene, linear low density polyethylene, very low density polyethylene, ultra low density polyethylene, medium density polyethylene, high density polyethylene, polyethylenes comprising copolymers of ethylene with one or more alpha-olefins (α-olefins) such as butene-1, hexene-1, octene-1, or the like as a comonomer, linear low density polyethylene, very low density polyethylene, ultra low density polyethylene, ethylene/propylene copolymers, polypropylene, propylene/ethylene copolymer, polyisoprene, polybutylene, polybutene, poly-3-methylbutene-1, poly-4-methylpentene-1, ethylene/unsaturated ester copolymer, ethylene/unsaturated acid copolymer, (especially ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT™ linear homogeneous ethylene/alpha olefin copolymer resins obtainable from the Exxon Chemical Company, of Baytown, Tex., and TAFMER' linear homogeneous ethylene/alpha-olefin copolymer resins obtainable from the Mitsui Petrochemical Corporation. All these materials generally include copolymers of ethylene with one or more comonomers selected from $C_{4-10}$ α-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY™ resins, are also included as another type of homogeneous ethylene/alpha-olefin copolymer useful in the present invention.

The ethylene/alpha-olefin copolymer comprises a copolymer resulting from the copolymerization of from about 80 to about 99 weight percent ethylene and from 1 to about 20 weight percent alpha-olefin. Preferably, the ethylene/alpha-olefin copolymer comprises a copolymer resulting from the copolymerization of from about 85 to about 95 weight percent ethylene and from about 5 to about 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. The phrase "outside layer" also is used with reference to the outermost layer of a plurality of concentrically arranged layers coextruded through an annular die.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

The multilayer heat-shrinkable film of the invention can be fully coextruded, in contrast to being the lamination of two films produced by separate extrusion processes. In a fully coextruded film, all layers of the film are extruded simultaneously. A fully coextruded film is free of lamination adhesive, with the layers of the film being melt bonded to one another.

At least a portion of the multilayer film of the present invention can optionally be irradiated to induce crosslinking. In the irradiation process, the film is subjected to one or more energetic radiation treatments, such as corona discharge, plasma, flame, ultraviolet, X-ray, gamma ray, beta ray, and high energy electron treatment, each of which induces cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is employed, preferably using an electron accelerator, with a dosage level being determined by standard dosimetry methods. Other accelerators such as a Van de Graaf or resonating transformer may be used. The radiation is not limited to electrons from an accelerator since any ionizing radiation may be used. The ionizing radiation can be used to crosslink the polymers in the film. Preferably, the film is irradiated at a level of from about 30 kGy to about 207 kGy, more preferably from about 30 kGy to about 140 kGy. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. The films of this invention can be corona-treated in a preferred embodiment.

Figure 2:
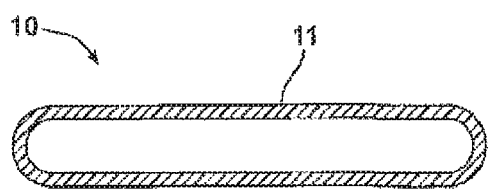
FIG. 2 is a transverse cross-sectional view of the end-seal bag of FIG. 1, taken through section 2-2 of FIG. 1.

FIG. 1 is a schematic of a preferred end-seal bag 10, in a lay-flat position; FIG. 2 is a cross-sectional view of bag 10 taken through section 2-2 of FIG. 1. Viewing FIGS. 1 and 2 together, bag 10 comprises bag film 11, top edge 12 defining an open top, first bag side edge 13, second bag side edge 14, bottom edge 15, and end seal 16.

Figure 3:
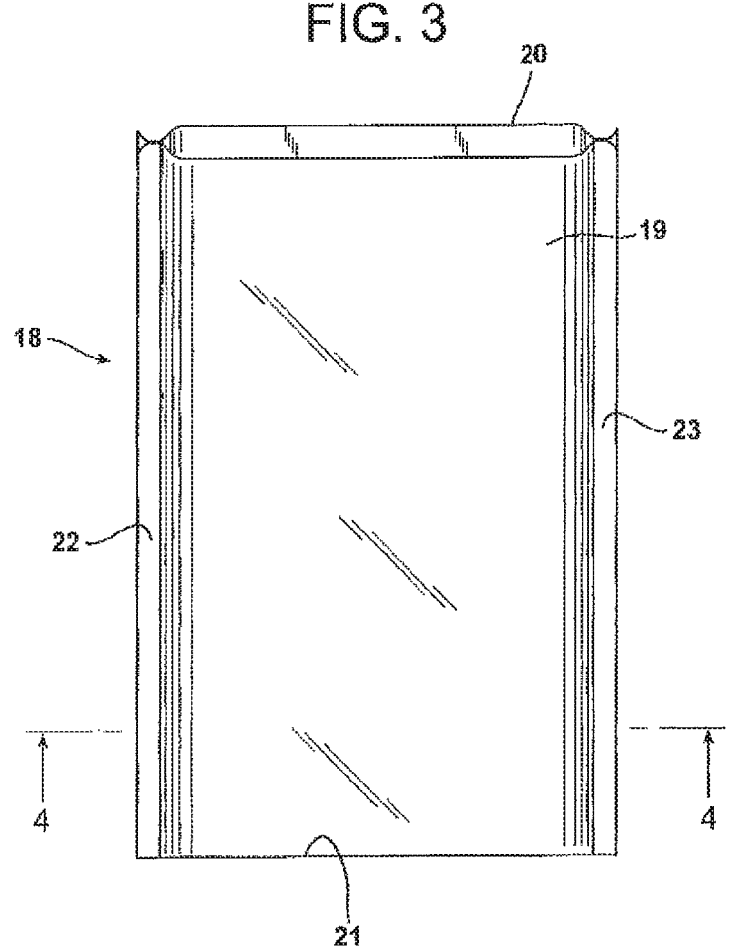
FIG. 3 is a schematic plan view of a side-seal bag.
Figure 4:
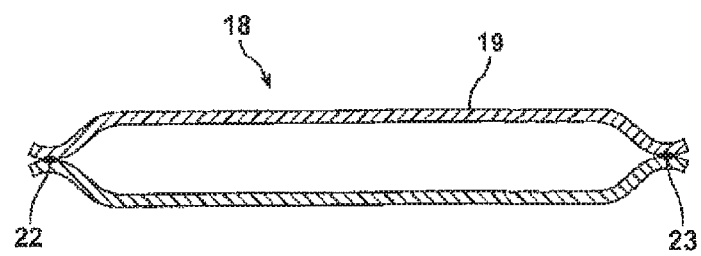
FIG. 4 is a transverse cross-sectional view of the side-seal bag of FIG. 3, taken through section 4-4 of FIG. 3.

FIGS. 3 and 4 illustrate side-seal bag 18. FIG. 3 illustrates a schematic of side seal bag 18, in a lay-flat view; FIG. 4 illustrates a cross-sectional view taken through section 4-4 of FIG. 3. With reference to FIGS. 3 and 4 together, side seal bag 18 is comprised of bag film 19, top edge 20 defining an open top, bottom edge 21, first side seal 22, and second side seal 23.

Figure 5:
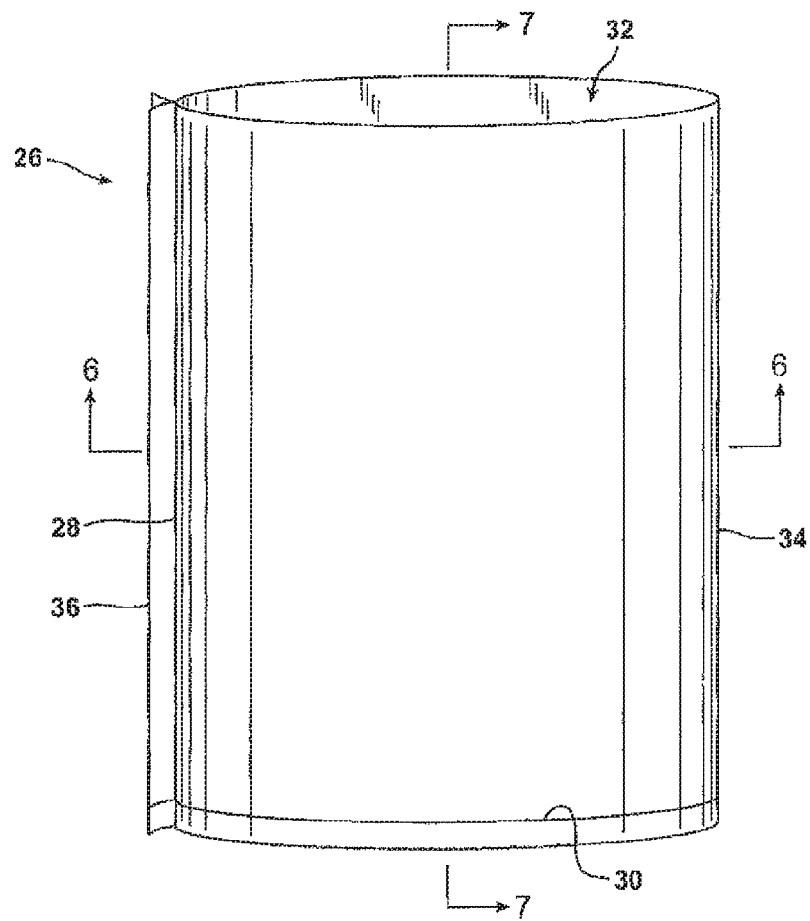
FIG. 5 is a schematic plan view of an L-seal bag.
Figure 6:
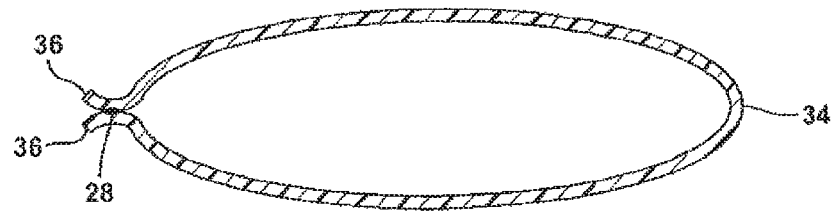
FIG. 6 is a transverse cross-sectional view of the L-seal bag of FIG. 5, taken through section 6-6 of FIG. 5.
Figure 7:
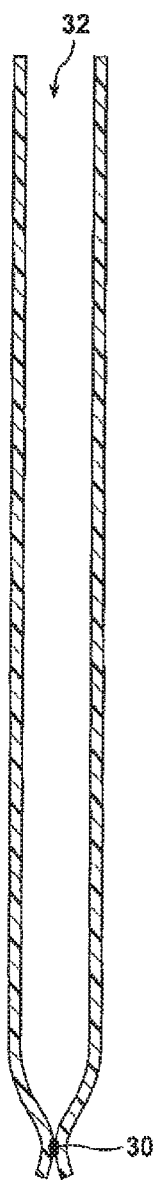
FIG. 7 is a longitudinal cross-sectional view of the L-seal bag of FIG. 5, taken through section 7-7 of FIG. 5.

FIG. 5 is a lay-flat view of a preferred L-seal bag 26, in a lay-flat position. FIG. 6 is a transverse cross-sectional view of L-seal bag 26, taken through section 6-6 of FIG. 5. FIG. 7 is a longitudinal cross-sectional view of L-seal bag 26 taken through section 7-7 of FIG. 5. Viewing FIGS. 5, 6, and 7 together, L-seal bag 26 has side-seal 28, bottom seal 30, open top 32, seamless folded bag side edge 34, and seamed bag side edges 36.

The fin-seal backseamed bag 38 of FIGS. 8 and 9 has open top 40, bottom seal 42, first folded side edge 44, second folded side edge 46, bottom edge 48, backseam seal 50 (inside film layer heat sealed to itself), and backseam fins 52.

Figure 10:
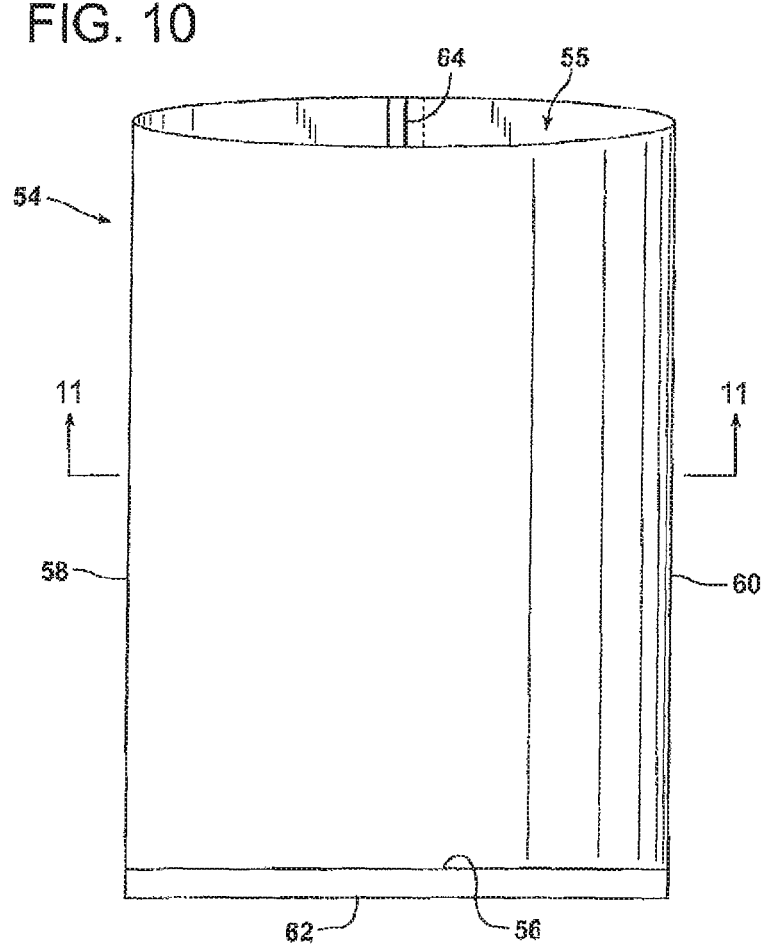
FIG. 10 is a schematic plan view of a backseamed bag having a lap-type backseam.
Figure 11:
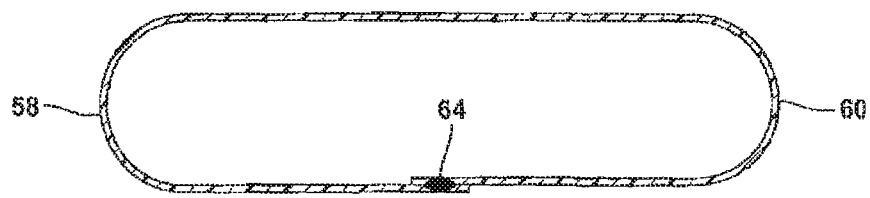
FIG. 11 is a transverse cross-sectional view of the backseamed bag of FIG. 10.

The lap-seal backseamed bag 54 of FIGS. 10 and 11 has open top 55, bottom seal 56, first folded side edge 58, second folded side edge 60, bottom edge 62, and backseam seal 64 (inside film layer heat sealed to outside film layer).

Figure 12:
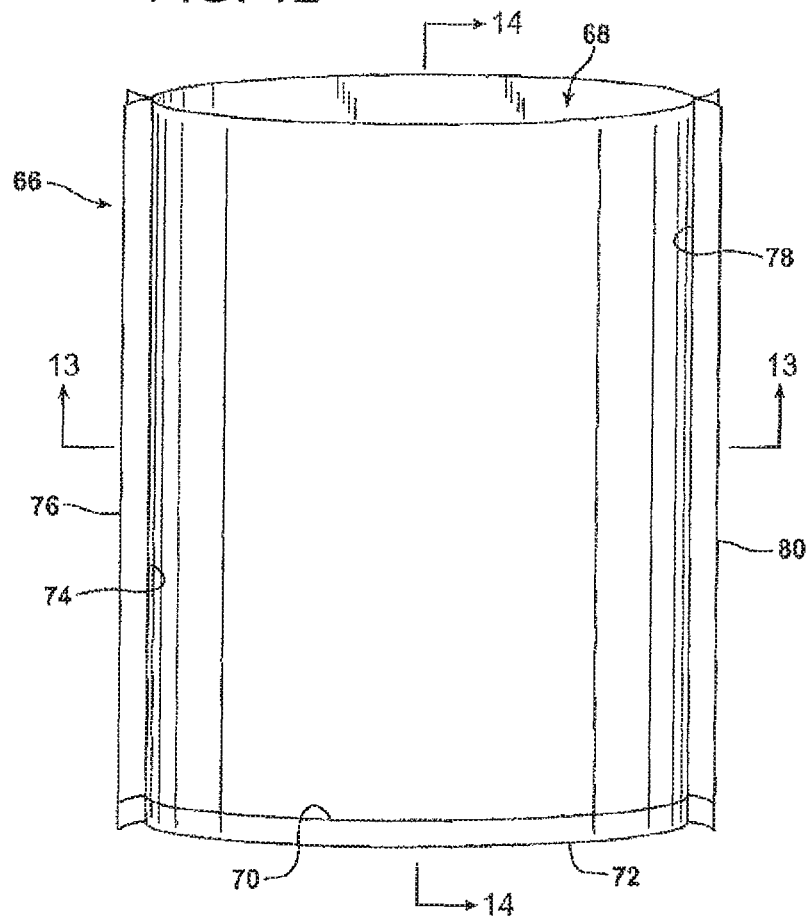
FIG. 12 is a schematic plan view of a pouch-type bag.
Figure 13:
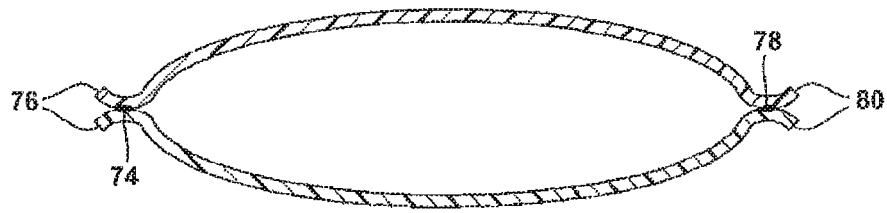
FIG. 13 is a transverse cross-sectional view of the pouch-type bag of FIG. 12, taken through section 13-13 of FIG. 12.
Figure 14:
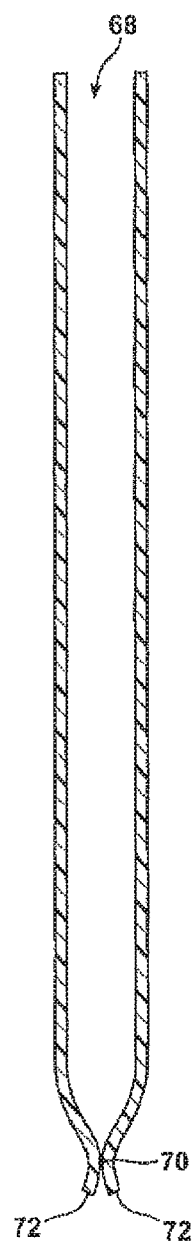
FIG. 14 is a longitudinal cross-sectional view of the pouch-type bag of FIG. 12, taken through section 14-14 of FIG. 12.

FIGS. 12, 13, and 14 illustrate a pouch-type bag 66 made from sealing two separate pieces of flat film together. In FIGS. 12, 13, and 14, pouch 66 has open top 68, bottom heat seal 70 and bottom edge 72, first side seal 74 and first side edge 76, second side seal 78 and second side edge 80. Together, first and second side seals 74 and 76 connect with bottom seal 70 to form a "U-shaped" seal connecting the two pieces of flat film together to form the pouch-type bag 66.

Figure 15:
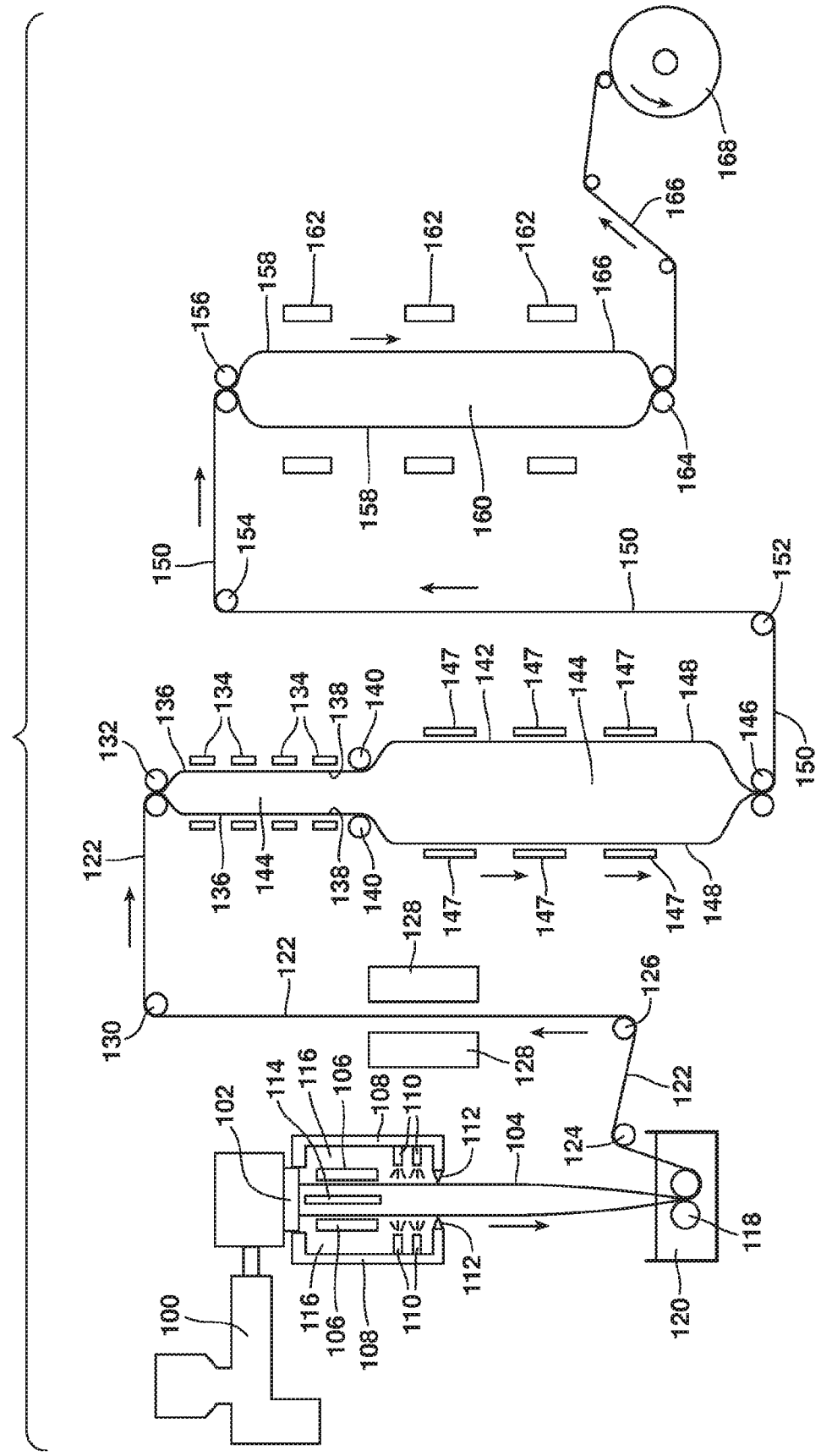
FIG. 15 is a schematic of a process used to make a heat-shrinkable film such as could be used to make a heat-shrinkable bag or for use in a flow wrap packaging process.

The process illustrated in FIG. 15 can be used to make multilayer heat-shrinkable film for use in the packaging articles of FIGS. 1-14, described above. In FIG. 15, solid polymer beads (not illustrated) are fed into a plurality of extruders 100. For simplicity, only one extruder 100 is illustrated in FIG. 15. Inside each extruder 100, polymer beads are forwarded, melted, and degassed, following which the resulting stream of bubble-free melt emitted from each extruder 100 is forwarded into annular multilayer die 102.

The melt streams from extruders 100 are fed into multilayer annular die 102, pass through multilayer annular die 102, and are emitted from annular die 102 in the form of discrete layers, resulting in annular multilayer extrudate 104, also referred to as a "tape." The number of extruders 100 may correspond with the number of discrete layers in multilayer annular extrudate 104, or may be less than the number of film layers if the extrudate from a single extruder 100 is split into two or more streams, with each stream being used to form a discrete layer of multilayer annular extrudate 104.

As annular extrudate 104 emerges from annular die 102, annular extrudate 104 passes inside calibrator 106, which is positioned below annular die 102 so that the upper edge of calibrator 106 is about 2 to 2.5 inches below the point at which annular extrudate 104 emerges from annular die 102. Calibrator 106 has a length of from 12 to 18 inches. Calibrator 106 is essentially a pipe with an outside surface and an inside surface. The inside surface controls the diameter of extrudate 104. Moreover, calibrator 106 provides quenching liquid to annular extrudate 104, as calibrator 106 is itself hollow and is connected to a source of cold water (not illustrated) which is pumped inside the walls of calibrator 106 from a chiller (not illustrated). A plurality of annular slots (not illustrated) in the inside surface of calibrator 106 feed streams of cold water between the inside surface of calibrator 106 and the outside surface of annular extrudate 104, in order to quench annular extrudate 104 as it emerges from annular die 102. In the making of the films in Table 2, below, calibrator 106 was supplied with 43° C. water, which was likely 46° C. to 48° C. before the water contacted annular extrudate 104. Calibrator 106 serves to control the size of the outside diameter of annular extrudate 104, as well as the quenching of annular extrudate 104.

Calibrator 106, as well as about four feet of the uppermost portion of annular extrudate 104, are surrounded by vacuum chamber 108. Supplemental cold water sprayers 110 are provided inside vacuum chamber 108. Vacuum chamber 108 is connected to a source of vacuum (not illustrated). The bottom edge of vacuum chamber 108 is provided with sealing ring 112 so that water emitted from the slots in calibrator 106, as well as water from sprayers 110, can be evacuated away, recirculated through the chiller, and recycled back into calibrator 106 sprayers 110.

Collapse of annular extrudate 104 is prevented by maintaining a slight superatmospheric pressure inside annular extrudate via centrally positioned pipe 114 passing through the center of annular die 102, and extending downward from annular die 102. Alternatively, or in addition to maintaining a slight positive pressure inside annular extrudate 104 (i.e., inside the "first bubble"), a slight vacuum, i.e., 15-18 millibars, is maintained by evacuating water and atmosphere from the internal region 116 inside vacuum chamber 108. In this manner, the diameter of annular extrudate 104 is closely controlled while the thermoplastic resins emitted from annular die 102 are quenched upon extrusion. Moreover the rate of extrusion of resin from annular die 102, in combination with control over the downward speed of annular extrudate 104 by governance of the surface speed of nip rollers 118, determines the amount of necking down of annular extrudate 104 as it emerges from annular die 102. Extrusion rate and roller surface speed were controlled so that annular extrudate 104 has an outside diameter appropriate for the internal diameter of calibrator 106.

Annular extrudate 104 moves downward into water bath 120, and is collapsed into lay-flat configuration as it passes through nip rollers 118 within water bath 120. The resulting lay-flat tubing 122 emerges from water bath 120 and passes over idler rollers 124 and 126, and then through optional irradiation chamber 128 and around idler roller 130, and then through upper nip rollers 132. Annular extrudate 104 can remain at an elevated temperature at the time it reaches nip rollers 132 (e.g., a ° $C._t$ of from 73° C. to 93° C. in Table 2 below).

Immediately upon passing through upper nip rollers 132, annular extrudate 122 is re-inflated to its extruded diameter (i.e., a first portion of the "second bubble") as it passes through four sets of heaters 134 positioned around the entirety of annular extrudate 136. Heaters 134 progressively heat inflated annular extrudate 136 to its softening point (e.g., a ° $C._b$ of from 56° C. to 130° C. in Table 2 below), after which inflated, softened annular extrudate 138 passes through a set of supporting guide rollers 140. Guide rollers 140 maintain inflated annular extrudate 136 and bubble 142 in a central position in the oven, so that annular extrudate 136 and bubble 142 can be heated evenly by the various heaters surrounding the second bubble. After passing through guide rollers 140, annular extrudate 138 is blown into oriented bubble 142 (i.e., the second portion of the second bubble).

The entirety of the second bubble contains trapped air 144 between upper nip rollers 132 and lower nip rollers 146. Lower nip rollers 146 have a surface speed higher than upper nip rollers 132, thereby stretching softened extrudate 138 in the machine direction. Moreover, the greater diameter of oriented bubble 142 provides transverse solid state orientation of extrudate 138. Three sets of supplemental heaters 147 are provided along oriented bubble 142. The result is biaxially oriented film tubing 148 at the downstream end of oriented bubble 142.

Thereafter, lower nip rollers 146 collapse biaxially oriented film tubing 148 into a lay-flat configuration, with the resulting lay-flat tubing 150 passing over idler rollers 152 and 154, and through nip rollers 156, after which lay-flat tubing 150 is reinflated into third bubble 158 which surrounds trapped air 160. Trapped air 160 is maintained inside third bubble 158 by upper nip rollers 156 and lower nip rollers 164. As the biaxially oriented film of bubble 158 passes downward, it is annealed by three sets of infrared annealing heaters surrounding bubble 158. The surface speed of upper nip rollers 156 is about the same as the surface speed of lower nip rollers 164. Upon passing through lower nip rollers 164, the resulting biaxially oriented, annealed film 166 is returned to lay-flat configuration, and is wound upon roll 168.

FIG. 16 illustrates the use of a heat-shrinkable film, such as the films of Table 2, below. The process illustrated in FIG. 16 is a type of horizontal form fill and seal process known in the packaging art as a "flow wrap" process. The process of FIG. 16 utilizes a continuous roll of flat film to package a product in a packaging article as illustrated in FIGS. 8 and 9 (or FIGS. 10 and 11), rather than pre-made bags or pouches as illustrated in FIGS. 1-9 and 12-14.

Although the process of FIG. 16 is at least theoretically capable of being run continuously, in actual use the process is intermittent, with different packagers having different frequency and duration of process interruption. The process of FIG. 16 does not produce a fully closed package. Rather, the product of the packaging operation illustrated in FIG. 16 results in a product inside the open packaging article illustrated in FIGS. 8-9 (described above), with the product inside the open packaging article being forwarded downstream to further machinery (described below) for completion of the packaging process.

In FIG. 16, products 302 are fed to packaging machine 303 via conveyor 304. Although product 302 can be any product to be packaged, a preferred product is a meat product, such as a roast, steak, chops, ribs, etc. Each product 302 can be an individual piece of meat or a set comprising a plurality of pieces of meat.

Conveyor 304 terminates as the input end of forming horn 306. Product 302 is pushed into forming horn 306 by a pusher (not illustrated). Product 302 is pushed onto the upper surface of continuous strand of film 308 as product 302 is pushed into and through forming horn 306. Continuous strand of film 308 (supplied from a roll of film, not illustrated) is forwarded into, through, and past forming horn 306 as a continuous stream of products 302 are individually pushed into forming horn 306. Once on film 308, products 302 are forwarded through forming horn 306 by the forwarding of the strand of film 308, i.e., at the same speed that film 308 passes into, through, and beyond forming horn 306. Once on film 308, the forwarding of film 308 forwards products 302 therewith.

Film 308 is folded as it passes through forming horn 306, so that as product 302 emerges from forming horn 306, film 308 is folded around product 302, with product 302 now being inside a tube 312 of film 308. Above forming shoe 306, the edges of film 308 are folded upward and a sealing apparatus (not illustrated) forms a continuous fin-type heat seal 310 along the upwardly folded longitudinal edges of film 308. The heat seal can be formed using, for example, three sets of seal heads, i.e., three sets of heat sealing nip rollers. The first set (upstream) of heat sealing nip rollers can have a temperature of 65° C. The second set (middle) of heat sealing nip rollers can have a temperature of 90° C. The third set (downstream) of heat sealing nip rollers can have a temperature of 150° C. The head pressure of the seal heads was 2 bar. The web speed was 17.2 meters per minute. During the formation of backseam heat seal 310, film 308 surrounding products 302 is forwarded by a second conveyor (not illustrated) on which film 308 and products 302 rest.

During process interruption in which the flow of products is temporarily halted, the seal heads are pulled away from the film so that the film is not burned by a long period of contact with the hot seal heads. Upon resumption of the process, seal heads are reapplied to the film and the backseaming is continued. Of course, it is desirable that the package be provided with a strong backseam seal even if a portion of the backseam seal was made before process interruption and a portion of the backseam seal was made after process resumption. It is desirable that such a package exhibit a burst strength at least 95 percent as high as the burst strength of a package made from the same film but in which the backseam seal was continuously produced, i.e., without interruption. Alternatively, the package having a backseam with portions made before and after process interruption can have a burst strength of at least 90 percent, or at least 85 percent, or at least 80 percent, or at least 75 percent as high as the burst strength of a corresponding package in which the backseam was continuously produced, i.e., without interruption.

The stream of products 302 inside now sealed film tubing 312 is forwarded to a transverse sealer and cutter including upper sealer/cutter member 314 and lower sealer/cutter member 316, which work together to make transverse seals between products 302, and to cut film tubing 312 apart to produce individual packaged products 318. The temperatures for each of the two transverse seal bars in members 314 and 316 may be, for example, 105° C. and 105° C., with the seal bar dwell time being, for example, 350 milliseconds. Upper and lower sealer/cutter bars 314, 316 oscillate upward and downward as film tubing 312 is forwarded. Upon being sealed on the downstream end and cut free of the backseamed film tubing, the result is partially packaged product 318 having a backseam down its length, a closed bottom seal, and an open top end, as illustrated in FIGS. 8 and 9, described above.

Upon exiting packaging machine 303, partially packaged products 318 are forwarded to a vacuum chamber machine in which atmosphere is evacuated from inside the package and the open end of the package is heat sealed closed, so that the product is completely surrounded by the heat shrinkable packaging article. The resulting evacuated, closed packaged product is thereafter forwarded to a shrink machine in which the film is shrunk against the product by passing the evacuated, closed packaged product through a hot air tunnel or by immersing the evacuated, closed packaged product in a bath of hot water.

The process of FIG. 16 is but one embodiment of the manner in which the film can be used. The process of FIG. 16 is called "flow wrap" and is a type of process known in the art as "horizontal form fill and seal." When used in conjunction with downstream vacuum packaging, it is referred to as a "flow vac process." The film can also be used in vertical form fill and seal packaging, as described in U.S. Pat. No. 5,491,019, to Kuo, which is hereby incorporated, in its entirety, by reference thereto. The film can be used to make packaging articles such as bags and pouches, including the bags and pouches illustrated in FIGS. 1 through 14.

EXAMPLES

The present invention can be further understood by reference to the following examples that are merely illustrative and are not to be interpreted as a limitation to the scope of the present invention that is defined by the appended claims. The films of the examples contained various resins identified in Table 1, below.

TABLE 1

| Resin | Tradename/Supplier | Chemical Nature | Properties & Parameters |
|---|---|---|---|
| LLDPE | Dowlex ® 2045.03 Dow | Linear Low Density Polyethylene (Ziegler Natta catalyzed) | 0.920 g/cm$^3$ 1.1 g/10 min 6.5 wt % octene mer |
| Et-Cop | ELVALOY ® PTW | ethylene copolymer | 0.94 g/cc 12 g/10 min 72° C. mp |
| sscPE-1 | Affinity ® PL 1850G Dow | Single site catalyzed polyethylene | 0.902 g/cc 3.0 g/10 min 97° C. mp |
| sscPE-2 | Affinity ® PF 1140G Dow | Single site catalyzed ethylene copolymer | 0.896 g/cc; 1.6 g/10 min 94° C. mp |
| sscPE-3 | Affinity ® PL 1281G1 Dow | Single site catalyzed ethylene/octene copolymer | 0.900 g/cc; 6.0 g/10 min 99° C. mp |
| sscPE-4 | EXCEED ® 4518PA ExxonMobil | Single site catalyzed ethylene/hexene copolymer | 0.92 g/cc; 4.5 g/10 min 116° C. mp |
| EVA | Escorene ® LD713.93 Exxon Mobil | Ethylene vinyl acetate copolymer | 0.933 g/cc; 3.5 g/10 min 87° C. mp |
| EVA-2 | ELVAX ® 3182-2 DuPont | Ethylene vinyl acetate copolymer | 0.95 g/cc; 3.0 g/10 min 74° C. mp; 28 wt % vinyl acetate |
| EMA | SP2260 EMA Copolymer Westlake Chemical | Ethylene methyl acrylate copolymer | 0.944 g/cc; 77° C. mp 24% methyl acrylate |
| EMA-2 | EMAC + SP1330 Westlake Chemical | Ethylene methyl acrylate copolymer | 0.944 g/cc; 2 g/10 min; mp 93° C. 22% methyl acrylate |
| EMA-3 | Lotoader AX 8900 Arkema | Ethylene methyl acrylate copolymer | 0.91 g/cc |

TABLE 1-continued

| Resin | Tradename/Supplier | Chemical Nature | Properties & Parameters |
|---|---|---|---|
| EMA-4 | Elvaloy AC 1224<br>DuPont | Ethylene methyl acrylate copolymer | 0.94 g/cc;<br>2 g/10 min;<br>mp 91° C.<br>20% methyl acrylate |
| mEMA | Bynel ® CXA 21E787<br>DuPont | Maleic anhydride modified ethylene/methyl acrylate copolymer | 0.93 g/cc;<br>1.6 g/10 min;<br>92° C. mp |
| EBA | SP 1903<br>Westlake Chemical | Ethylene butyl acrylate copolymer | 18% butyl acrylate;<br>0.928 g/cc;<br>0.45 g/10 min |
| mLLD-1 | Plexar ® PX 3227<br>Nippon Goshei | Maleic anhydride modified LLDPE | 0.913 g/cm$^3$<br>1.7 g/10 min |
| mLLD-2 | Admer ® AT2754A<br>Mitsui Petrochemical | Maleic anhydride modified polyethylene | 0.900 g/cc;<br>2.0 g/10 min<br>96° C. mp |
| mLLD-3 | Amplify ® GR216<br>Dow | Anhydride modified linear low density polyethylene | 0.875 g/cc; 1.3 mfi<br>62.8° C. mp |
| SEC | MD-6932M (G1643 MS)<br>Kraton Polymers | Styrene/ethylene copolymer | 0.9 g/cc;<br>1.8 g/10 min |
| SBC | Styroflex ® 2G 66<br>BASF | Styrene/butadiene copolymer - Styrene/butadiene/styrene tribiock copolymer | 0.99 g/cc;<br>12.5 g/10 min |
| SBC-2 | FG1901GT<br>Kraton Polymers | Styrene butadiene multiblock copolymer | 0.91 g/cc;<br>22 g/10 min |
| SBC-3 | FG1924<br>Kraton Polymers | Styrene butadiene multiblock copolymer | Melt index:<br>40 (230 C./5 Kg) |
| g-SEBS | KRATON ® FG1901G<br>Kraton Polymers | maleic anhydride-grafted linear Styrene/ethylene/butylene Triblock copolymer (styrene/rubber 30/70) | 0.91 g/cc;<br>22 g/10 min<br>230° C. melt point |
| ENB | TOPAS ® 9903D-10<br>Topas Advanced Polymers, Inc. | Ethylene/norbornene copolymer | 0.974 g/cc;<br>1.0 g/10 min |
| PA 6 | ULTRAMID ® B40<br>BASF | Polyamide 6 | 1.13 g/cc<br>220° C. melt point |
| PA6/66 | Ultramid ® C33 01<br>BASF | Polyamide 6/66 | 1.13 g/cm$^3$<br>196° C. melt point |
| PA6I/6T | Grivory ® G21 Natural<br>EMS Grivory | Polyamide 6I/6T | 1.18 g/cc;<br>$T_g$ 125° C. |
| PAMXD6 | MXD6 Nylon S6007<br>Mitsubishi Eng. - Plastics | Polyamide MXD6 | 1.22 g/cc<br>237° C. mp |
| PET-1 | Eastapak ® Copolyester 9921<br>Eastman Chemical | copolyester | 1.40 g/cc<br>255° C. mp |
| PET-2 | Eastapak ® 32897 APET<br>Eastman Chemical | copolyester | 1.3 g/cc |
| PET-3 | Vitel 1901NSB-P<br>Bostik | copolyester | 1.23 g/cc<br>Intrinsic viscosity of:<br>0.92 dl/g;<br>melt point 121° C. |
| PET-4 | Arnitel L-X07110<br>DSM | Polyester | 1.25 g/cc |
| PETG | Eastar ® PETG 6763<br>Eastman Chemical | Polyethylene terephthalate/glycol | 1.27 g/cc<br>2.8 g/10 min |
| EVOH-1 | Eval ® XEP-1232<br>Evalca/Kuraray | Hydrolyzed ethylene vinyl acetate (EVOH) | 1.15 g/cc;<br>1.5 g/10 min<br>38% ethylene |
| EVOH-2 | Eval ® SP292B<br>Evalca/Kuraray | Hydrolyzed ethylene vinyl acetate copolymer (EVOH) | 1.14 g/cc;<br>2.1 g/10 min<br>44% ethylene |
| EVOH-3 | XEP-1321B<br>Evalca/Kuraray | Hydrolyzed ethylene vinyl acetate copolymer (EVOH) | 1.15 g/cc;<br>4.0 g/10 min<br>38% ethylene;<br>mp 148° C. |
| EVOH-4 | Soranol ® ET3803<br>Nippon Goshei | Ethylene vinyl alcohol copolymer containing 38% ethylene | 1.17 g/cc;<br>3.2 g/10 min<br>173° C. melt point |
| S&AB | 1070SB<br>Ingenia Polymers | Slip and Antiblock in LLDPE | 0.98 g/cc;<br>5.5 g/10 min<br>122° C. mp |
| S&AB-2 | 10853 Antiblock<br>Ampacet | Silica in LLDPE | 1.00 g/cc;<br>1.5 g/10 min<br>122° C. mp |
| PETME | T Me S606<br>Sukano | Crosslinker additive Melt enhancer for polyester | 6% SiO$_2$; 10% wax; 0.8 g/cc; 1.2 g/cc; 0.5% moisture; 82° C. vicat softening point |

The resins identified in Table 1, above, were used in the preparation of the films of Table 2, below. The films of Table 2, below, were prepared using the process illustrated in FIG. 15, described above.

TABLE 2

| Film No. | Work or comp | Layer 1 (inside) | Layer 2 | Layer 3 | Layer 4 | Layer 5 | Layer 6 | Layer 7 | Vol % PET | Orient (md & td) °C.r: tape °C.b: bubble | free shrink @185° F. (85 C.) Front (% TD/% MD) Back (% TD/MD %) | Comment |
|---|---|---|---|---|---|---|---|---|---|---|---|---|
| 1 | C | 80% sscPE-1 15% LLDPE 5% S&AB (0.55 mil) | mLLD-2 (0.11 mil) | 90% PA6/66 10% PA6I/6T (0.05 mil) | EVOH-1 (0.08 mil) | mEMA (0.08 mil) | mEMA (0.08 mil) | PET-1 (0.63 mil) | 39.8 | 3.5X MD 3.3X TD 73° C.r 93° C.b | Front 45/46 Back 40/42 | Severe corner delamination due to differential shrink; tie layer unable to keep up; severe curl |
| 2 | C | 80% sscPE-1 15% LLDPE 5% S&AB (0.55 mil) | mLLD-2 (0.11 mil) | 90% PA6/66 10% PA6I/6T (0.05 mil) | EVOH-1 (0.08 mil) | mEMA (0.08 mil) | mEMA (0.08 mil) | PET-1 (0.63 mil) | 39.8 | 3.3X MD 3.1X TD 78° C.r 68° C.b | Front 35/38 Back 38/43 | Edge and corner delamination; severe curl |
| 3 | C | 81% sscPE-1 15% LLDPE 4% S&AB (0.47 mil) | mLLD-2 (0.12 mil) | 90% PA6/66 10% PA6I/6T (0.06 mil) | EVOH-4 (0.06 mil) | mEMA (0.12 mil) | PET-1 (0.18 mil) | PET-1 (0.18 mil) | 30.3 | 3.5X MD 3.25X TD 82° C.r 85° C.b | Front 32/40 Back 32/42 | Edge pucker and delamination; pre-shrunk sample curls |
| 4 | C | 81% sscPE-1 15% LLDPE 4% S&AB (0.47 mil) | mLLD-2 (0.12 mil) | 90% PA6/66 10% PA6I/6T (0.06 mil) | EVOH-4 (0.06 mil) | mEMA (0.12 mil) | PET-1 (0.18 mil) | PET-1 (0.18 mil) | 30.3 | 3.5X MD 3.25X TD 82° C.r 87° C.b | DNR | DNR (DNR = data not recorded) |
| 5 | C | 81% sscPE-1 15% LLDPE 4% S&AB (0.47 mil) | mLLD-2 (0.12 mil) | 90% PA6/66 10% PA6I/6T (0.06 mil) | EVOH-4 (0.06 mil) | mEMA (0.12 mil) | PET-1 (0.18 mil) | PET-1 (0.18 mil) | 30.3 | 3.5X MD 3.25X TD 88° C.r 83° C.b | DNR | DNR |
| 6 | C | 81% sscPE-1 15% LLDPE 4% S&AB (0.47 mil) | mLLD-2 (0.16 mil) | 90% PA6/66 10% PA6I/6T (0.08 mil) | EVOH-2 (0.08 mil) | mEMA (0.16 mil) | PET-1 (0.24 mil) | PET-1 (0.24 mil) | 30.2 | 3.5X MD 3.2X TD 79° C.r 83° C.b | Front 30/41 Back 36/40 | Severe pucker and delamination all over edge and corner can separate sample; severe curl |
| 7 | C | 60% sscPE-1 15% LLDPE 20% EVA 5% S&AB (0.47 mil) | mLLD-2 (0.16 mil) | 90% PA6/66 10% PA6I/6T (0.05 mil) | EVOH-3 (0.08 mil) | mEMA (0.16 mil) | PET-1 (0.31 mil) | PET-1 (0.31 mil) | 39.5 | 3.3X MD 3.1X TD 75° C.r 74° C.b | Front 38/40 Back 40/42 | Corner and edge pucker and delamination; severe curl |
| 8 | C | 70% sscPE-1 15% LLDPE 10% EVA 5% S&AB (0.63 mil) | mLLD-2 (0.16 mil) | 90% PA6/66 10% PA6I/6T (0.08 mil) | EVOH-3 (0.08 mil) | mEMA (0.16 mil) | PET-1 (0.24 mil) | PET-1 (0.24 mil) | 30.2 | 3.3X MD 3.1X TD 76° C.r 74° C.b | Front 35/40 Back 35/43 | Sample edge delaminates; one sample is OK |
| 9 | C | 80% sscPE-2 15% LLDPE 5% S&AB (0.55 mil) | mLLD-2 (0.11 mil) | 90% PA6/66 10% PA6I/6T (0.05 mil) | EVOH-1 (0.08 mil) | mEMA (0.08 mil) | mEMA (0.08 mil) | PET-1 (0.63 mil) | 39.9 | 3.3X MD 3.1X TD 77° C.r 73° C.b | Front 35/40 Back 37/48 | Severe curl on pre-shrunk sample |
| 10 | C | 80% sscPE-2 15% LLDPE 5% S&AB (0.63 mil) | mLLD-2 (0.16 mil) | 90% PA6/66 10% PA6I/6T (0.08 mil) | EVOH-3 (0.08 mil) | mEMA (0.16 mil) | PET-1 (0.24 mil) | PET-1 (0.24 mil) | 30.2 | 3.2X MD 3.2X TD 72° C.r 74° C.b | Front 40/47 Back 45/50 | Severe edge delamination, pucker, sample has orange peel; severe curl |

TABLE 2-continued

| Film No. | Work or comp | Layer 1 (inside) | Layer 2 | Layer 3 | Layer 4 | Layer 5 | Layer 6 | Layer 7 | Vol % PET | Orient (md & td) °$C_r$: tape °$C_b$: bubble | free shrink @185° F. (85 C.) Front (% TD/% MD) Back (% TD/MD %) | Comment |
|---|---|---|---|---|---|---|---|---|---|---|---|---|
| 11 | C | 80% sscPE-2 15% LLDPE 5% S&AB (0.63 mil) | mLLD-2 (0.16 mil) | 90% PA6/66 10% PA6I/6T (0.08 mil) | EVOH-3 (0.08 mil) | mEMA (0.16 mil) | PET-1 (0.24 mil) | PET-1 (0.24 mil) | 30.2 | 3.2X MD 3.5X TD 82° $C_r$ 102° $C_b$ | Front 42/51 Back 41/52 | DNR |
| 12 | C | 80% sscPE-2 15% LLDPE 5% S&AB (0.60 mil) | mLLD-2 (0.08 mil) | 90% PA6/66 10% PA6I/6T (0.08 mil) | EVOH-1 (0.08 mil) | mLLD-2 (0.08 mil) | mEMA (0.08 mil) | PET-1 (0.66 mil) | 39.8 | 3.5X MD 3.1X TD 78° $C_r$ 56° $C_b$ | Front 55/62 Back 54/55 | Edge delamination; pre shrink sample has striations, non-uniform texture (possibly die lines); non-optimized sample |
| 13 | W | 80% sscPE-2 15% LLDPE 5% S&AB (0.60 mil) | mLLD-2 (0.08 mil) | 90% PA6/66 10% PA6I/6T (0.08 mil) | EVOH-3 (0.08 mil) | 90% EMA 10% SEC (0.08 mil) | mEMA (0.08 mil) | PET-1 (0.33 mil) | 41.8 | 3.5X MD 3.0X TD 85° $C_r$ 85° $C_b$ | Front 30/40 Back 30/35 | No delamination, tie right adjacent to EVOH, sample has wrinkled appearance; very flat, not much curl, sample as melt-ripples/orange peel |
| 14 | W | 80% sscPE-2 15% LLDPE 5% S&AB (0.44 mil) | mLLD-2 (0.08 mil) | 90% PA6/66 10% PA6I/6T (0.08 mil) | EVOH-1 (0.08 mil) | 80% EMA 20% SEC (0.08 mil) | PET-1 (0.33 mil) | PET-1 (0.33 mil) | 41.8 | —X MD —° $C_r$ —° $C_b$ | Front 30/32 Back 30/45 | No delamination but sample has wrinkled appearance; right tie layer adjacent to EVOH; very flat, not much curl, sample as melt-ripples/orange peel |
| 15 | C | 80% sscPE-2 15% LLDPE 5% S&AB (0.44 mil) | mLLD-2 (0.16 mil) | 90% PA6/66 10% PA6I/6T (0.08 mil) | EVOH-3 (0.08 mil) | mEMA (0.16 mil) | PET-1 (0.33 mil) | PET-1 (0.33 mil) | 41.8 | 3.5X MD 3.1X TD 80° $C_r$ 71° $C_b$ | Front 37/42 Back 32/37 | Mostly corner and some edge delamination; curl not that bad |
| PRO 16 | C | 80% sscPE-1 15% LLDPE 5% S&AB (0.44 mil) | mLLD-2 (0.08 mil) | 90% PA6/66 10% PA6I/6T (0.08 mil) | EVOH-3 (0.08 mil) | mEMA (0.16 mil) | PET-1 (0.33 mil) | PET-1 (0.33 mil) | 41.8 | 3.5X MD 3.1X TD 76° $C_r$ 82° $C_b$ | DNR | DNR |
| 17 | C | 80% sscPE-1 15% LLDPE 5% S&AB (0.44 mil) | mLLD-2 (0.16 mil) | 90% PA6/66 10% PA6I/6T (0.08 mil) | EVOH-3 (0.08 mil) | mEMA (0.16 mil) | PET-1 (0.33 mil) | PET-1 (0.33 mil) | 41.8 | 3.4X MD 3.1X TD 80° $C_r$ 99° $C_b$ | DNR | DNR |
| 18 | C | 85% sscPE-2 15% LLDPE (0.71 mil) | mLLD-2 (0.08 mil) | 90% PA6/66 10% PA6I/6T (0.08 mil) | EVOH-3 (0.08 mil) | mEMA (0.16 mil) | PET-1 (0.24 mil) | PET-1 (0.24 mil) | 30.2 | 3.0X MD 3.4X TD 80° $C_r$ 100° $C_b$ | Front 38/38 Back 37/33 | corner delamination; gross delamination, run with sealant out; very severe curl |
| 19 | — | 85% sscPE-2 15% LLDPE (0.71 mil) | mLLD-2 (0.08 mil) | 90% PA6/66 10% PA6I/6T (0.08 mil) | EVOH-3 (0.08 mil) | mLLD-1 (0.16 mil) | 80% EMA 20% SEC (0.24 mil) | PET-1 (0.24 mil) | 15.1 | 3.2X MD 3.8X TD 80° $C_r$ 96° $C_b$ | Front 38/38 Back 37/33 | corner delamination; curl prevents gross delamination; severely wrinkled film; not optimized, may be due to process conditions; run with 0 kGy irradiation |
| 20 | — | 85% sscPE-2 15% LLDPE (0.71 mil) | mLLD-2 (0.08 mil) | 90% PA6/66 10% PA6I/6T (0.08 mil) | EVOH-3 (0.08 mil) | mLLD-1 (0.16 mil) | 80% EMA 20% SEC (0.24 mil) | PET-1 (0.24 mil) | 15.1 | 3.2X MD 3.8X TD 80° $C_r$ 96° $C_b$ | Front 40/42 Back 44/47 | Edge and corner delamination; severely wrinkled film; not optimized, may be due to process conditions; run with 31 kGy irradiation |

TABLE 2-continued

| Film No. | Work or comp | Layer 1 (inside) | Layer 2 | Layer 3 | Layer 4 | Layer 5 | Layer 6 | Layer 7 | Vol % PET | Orient (md & td) °C$_t$: tape °C$_b$: bubble | free shrink @185° F. (85 C.) Front (% TD/% MD) Back (% TD/MD %) | Comment |
|---|---|---|---|---|---|---|---|---|---|---|---|---|
| 21 | — | 85% sscPE-2 15% LLDPE 5% S&AB (0.71 mil) | mLLD-2 (0.08 mil) | 90% PA6/66 10% PA6I/6T (0.08 mil) | EVOH-3 (0.08 mil) | mLLD-1 (0.16 mil) | 80% EMA 20% SEC (0.24 mil) | PET-1 (0.24 mil) | 15.1 | 3.2X MD 3.8X TD 80° C$_t$ 96° C$_b$ | Front 47/52 Back 44/49 | Severe edge and corner delamination; severely wrinkled film; not optimized, may be due to process conditions; run with 61 kGy irradiation |
| 22 | W | PET-1 (0.47 mil) | mLLD-2 (0.16 mil) | 90% PA6/66 10% PA6I/6T (0.08 mil) | EVOH-3 (0.08 mil) | mLLD-1 (0.08 mil) | 80% EMA 10% SEC 10% mLLD-3 (0.08 mil) | PET-1 (0.39 mil) | 24.7 | 3.5X MD 3.1X TD 85° C$_t$ 85° C$_b$ | L + T 73% | DNR |
| 23 | W | PET-1 (0.47 mil) | mLLD-2 (0.16 mil) | 90% PA6/66 10% PA6I/6T (0.08 mil) | EVOH-3 (0.08 mil) | mLLD-1 (0.08 mil) | 80% EMA 10% SEC 10% mLLD-3 (0.08 mil) | PET-1 (0.39 mil) | 24.7 | 3.2X MD 3.5X TD 80° C$_t$ 103° C$_b$ | Front 33/40 Back 29/40 | DNR |
| 24 | W | PET-1 (0.47 mil) | mLLD-2 (0.16 mil) | 90% PA6/66 10% PA6I/6T (0.08 mil) | EVOH-3 (0.08 mil) | mLLD-1 (0.08 mil) | 80% EMA 20% SEC (0.24 mil) | PET-1 (0.39 mil) | 24.7 | 3.2X MD 3.4X TD 80° C$_t$ 104° C$_b$ | Front 33/41 Back 36/45 | No delamination; severe curl |
| 25 | W | PET-1 (0.47 mil) | 80% EMA 10% SEC 10% mLLD-3 (0.08 mil) | mLLD-1 (0.08 mil) | EVOH-3 (0.08 mil) | 90% PA6/66 10% PA6I/6T (0.08 mil) | mLLD-2 (0.08 mil) | 85% sscPE-3 15% LLDPE (0.71 mil) | 29.7 | 3.1X MD 3.6X TD 78° C$_t$ 100° C$_b$ | Front 76% (L + T) Back 80% (L + T) | No delamination |
| 26 | W | PET-1 (0.47 mil) | 80% EMA 10% SEC 10% mLLD-3 (0.08 mil) | mLLD-1 (0.08 mil) | EVOH-2 (0.08 mil) | 90% PA6/66 10% PA6I/6T (0.08 mil) | mLLD-2 (0.08 mil) | 85% sscPE-3 15% LLDPE (0.71 mil) | 29.7 | 3.2X MD 3.6X TD 76° C$_t$ 97° C$_b$ | Front 81% (L + T) Back 85% (L + T) | No delamination |
| 27 | W | PET-1 (0.47 mil) | 80% EMA 10% SEC 10% mLLD-3 (0.08 mil) | mLLD-1 (0.08 mil) | EVOH-3 (0.08 mil) | 90% PA6/66 10% PA6I/6T (0.08 mil) | mLLD-2 (0.08 mil) | 85% sscPE-3 15% LLDPE (0.71 mil) | 29.7 | 3.2X MD 3.5X TD 78° C$_t$ 97° C$_b$ | Front 76% (L + T) Back 81% (L + T) | No delamination |
| 28 | W | PET-1 (0.47 mil) | 80% EMA 10% SEC 10% mLLD-3 (0.08 mil) | mLLD-1 (0.08 mil) | EVOH-2 (0.08 mil) | 90% PA6/66 10% PA6I/6T (0.08 mil) | mLLD-2 (0.08 mil) | 85% sscPE-3 15% LLDPE (0.71 mil) | 29.7 | 3.2X MD 3.7X TD 76° C$_t$ 94° C$_b$ | Front 73% (L + T) Back 76% (L + T) | No delamination |
| 29 | W | PET-1 (0.47 mil) | 80% EMA 10% SEC 10% mLLD-3 (0.08 mil) | mLLD-1 (0.08 mil) | EVOH-2 (0.08 mil) | 90% PA6/66 10% PA6I/6T (0.08 mil) | mLLD-2 (0.08 mil) | 85% sscPE-3 15% LLDPE ~15% LLDPE (0.71 mil) | 29.7 | 3.1X MD 3.7X TD 79° C$_t$ 97° C$_b$ | Front 30/37 Back 27/35 | No delamination; uneven texture of sample; white lines |
| 30 | W | PET-1 (0.47 mil) | 80% EMA 10% SEC 10% mLLD-3 (0.08 mil) | mLLD-1 (0.08 mil) | EVOH-4 (0.08 mil) | 90% PA6/66 10% PA6I/6T (0.08 mil) | mLLD-2 (0.08 mil) | 85% sscPE-3 15% LLDPE (0.71 mil) | 29.7 | 3.1X MD 3.7X TD 80° C$_t$ 97° C$_b$ | Front 40/44 Back 43/47 | Some edge pucker but no delamination; sample rigid, uneven; sample has some curl |
| 31 | W | PET-1 (0.24 mil) | PET-1 (0.24 mil) | 80% EMA 10% SEC 10% mLLD-3 (0.08 mil) | EVOH-2 (0.08 mil) | 90% PA6/66 10% PA6I/6T (0.08 mil) | mLLD-2 (0.08 mil) | 85% sscPE-3 15% LLDPE (0.71 mil) | 31.8 | 3.2X MD 3.7X TD 76° C$_t$ 91° C$_b$ | Front 42/42 Back 42/44 | No delamination; sample has some curl |

TABLE 2-continued

| Work Film or No. comp | Layer 1 (inside) | Layer 2 | Layer 3 | Layer 4 | Layer 5 | Layer 6 | Layer 7 | Vol % PET | Orient (md & td) °$C_t$: tape °$C_b$: bubble | free shrink @185° F. (85 C.) Front (% TD/% MD) Back (% TD/MD %) | Comment |
|---|---|---|---|---|---|---|---|---|---|---|---|
| 32 W | PET-1 (0.24 mil) | PET-1 (0.24 mil) | 80% EMA 10% SEC 10% mLLD-3 (0.08 mil) | EVOH-2 (0.08 mil) | mLLD-2 (0.08 mil) | sscPE-3 (0.16 mil) | 85% sscPE-3 15% LLDPE (0.63 mil) | 31.8 | 3.2X MD 3.7X TD 79° $C_t$ 93° $C_b$ | Front 75% (L + T) Back 90% (L + T) | Curled up a lot |
| 33 W | 80% sscPE-3 17% LLDPE 3% S&AB (0.71 mil) | mLLD-2 (0.08 mil) | 90% PA6/66 10% PA6I/6T (0.08 mil) | EVOH-3 (0.08 mil) | mLLD-2 (0.08 mil) | 80% EMA 10% SEC 10% mLLD-3 (0.08 mil) | PET-1 (0.47 mil) | 29.7 | 3.2X MD 3.7X TD 86° $C_t$ 100° $C_b$ | Front 40/44 Back 39/42 | No delamination; shrunk sample clearer than un shrunk; sample striated, not uniformin in appearance; sample has some curl |
| 34 W | 80% sscPE-3 17% LLDPE 3% S&AB (0.71 mil) | mLLD-2 (0.08 mil) | 90% PA6/66 10% PA6I/6T (0.08 mil) | EVOH-3 (0.08 mil) | mLLD-2 (0.08 mil) | 80% EMA 10% SEC 10% mLLD-3 (0.08 mil) | PET-1 (0.47 mil) | 29.7 | 3.3X MD 3.8X TD 77° $C_t$ 96° $C_b$ | Front 74% (L + T) Back 69% (L + T) | DNR |
| 35 W | 80% sscPE-3 17% LLDPE 3% S&AB (0.71 mil) | mLLD-2 (0.08 mil) | 90% PA6/66 10% PA6I/6T (0.08 mil) | EVOH-3 (0.08 mil) | mLLD-2 (0.08 mil) | 80% EMA 10% SEC 10% mLLD-3 (0.08 mil) | PET-1 (0.47 mil) | 29.7 | 3.2X MD 4.0X TD 81° $C_t$ 97° $C_b$ | Front 34/40 Back 30/40 | DNR |
| 36 W | 80% sscPE-3 17% LLDPE 3% S&AB (0.71 mil) | mLLD-2 (0.08 mil) | 90% PA6/66 10% PA6I/6T (0.08 mil) | EVOH-3 (0.08 mil) | mLLD-2 (0.08 mil) | 80% EMA 10% SEC 10% mLLD-3 (0.08 mil) | PET-1 (0.47 mil) | 29.7 | 3.1X MD 3.9X TD 82° $C_t$ 99° $C_b$ | Front 76% (L + T) Back 74% (L + T) | DNR |
| 37 W | 85% sscPE-3 15% LLDPE (0.71 mil) | mLLD-2 (0.08 mil) | 90% PA6/66 10% PA6I/6T (0.08 mil) | EVOH-3 (0.08 mil) | mLLD-2 (0.08 mil) | 80% EMA 10% SEC 10% mLLD-3 (0.08 mil) | PET-1 (0.47 mil) | 29.7 | 3.1X MD 3.9X TD 79° $C_t$ 97° $C_b$ | Front 34/40 Back 30/40 | DNR |
| 38 W | 80% sscPE-3 17% LLDPE 3% S&AB (0.71 mil) | mLLD-2 (0.08 mil) | 90% PA6/66 10% PA6I/6T (0.08 mil) | EVOH-3 (0.08 mil) | mLLD-2 (0.08 mil) | 80% EMA 10% SEC 10% mLLD-3 (0.08 mil) | PET-1 (0.47 mil) | 29.7 | 3.3X MD 3.5X TD 78° $C_t$ 82° $C_b$ | Front 38/41 Back 32/38 | DNR |
| 39 W | 80% sscPE-3 17% LLDPE 3% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 80% EMA 10% SEC 10% mLLD-3 (0.08 mil) | PET-1 (0.47 mil) | 29.7 | 3.2X MD 3.9X TD 81° $C_t$ 94° $C_b$ | Front 36/44 Back 30/39 | 70μ film thickness; DNR |
| 40 W | 80% sscPE-3 17% LLDPE 3% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 80% EMA 10% SEC 10% mLLD-3 (0.08 mil) | PET-1 (0.47 mil) | 29.7 | 3.1X MD 3.9X TD 80° $C_t$ 99° $C_b$ | Front 31/40 Back 32/40 | 40μ film thickness; DNR |
| 41 W | 80% sscPE-3 17% LLDPE 3% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 80% EMA 10% SEC 10% mLLD-3 (0.08 mil) | PET-1 (0.47 mil) | 29.7 | 3.4X MD 3.4X TD 77° $C_t$ 86° $C_b$ | Front 68% (L + T) Back 74% (L + T) | Has a little curl |
| 42 W | 80% sscPE-3 17% LLDPE 3% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 80% EMA 10% SEC 10% mLLD-3 (0.08 mil) | PET-1 (0.47 mil) | 29.7 | 3.4X MD 2.2X TD 75° $C_t$ 91° $C_b$ | Front 39/45 Back 37/47 | 40μ film thickness; DNR |

TABLE 2-continued

| Film No. | Work or comp | Layer 1 (inside) | Layer 2 | Layer 3 | Layer 4 | Layer 5 | Layer 6 | Layer 7 | Vol % PET | Orient (md & td) °C$_t$: tape °C$_b$: bubble | free shrink @185° F. (85 C.) Front (% TD/% MD) Back (% TD/MD %) | Comment |
|---|---|---|---|---|---|---|---|---|---|---|---|---|
| 43 | W | 80% sscPE-3 17% LLDPE 3% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 80% EMA 10% SEC 10% mLLD-3 (0.08 mil) | PET-1 (0.47 mil) | 29.7 | 3.4X MD 3.5X TD 76° C$_t$ 86° C$_b$ | Front 33/402 Back DNR- | No delamination; sample is wrinkled, rigid and uneven; severe curl; curls up into roll |
| 44 | W | 80% sscPE-3 17% LLDPE 3% S&AB (0.71 mil) | mLLD-2 (0.08 mil) | 90% PA6/66 10% PA6I/6T (0.08 mil) | EVOH-2 (0.08 mil) | 80% EMA 10% SEC 10% mLLD-3 (0.08 mil) | PET-1 (0.08 mil) | PET-1 (0.47 mil) | 29.7 | 3.2X MD 3.9X TD 89° C$_t$ 95° C$_b$ | Front 40/482 Back 38/46 | No delamination; sample is wrinkled, rigid and uneven; severe curl; curls up into roll |
| 45 | W | 80% sscPE-3 17% LLDPE 3% S&AB (0.71 mil) | sscPE-3 (0.08 mil) | mLLD-2 (0.08 mil) | EVOH-2 (0.08 mil) | 80% EMA 10% SEC 10% mLLD-3 (0.08 mil) | PET-1 (0.08 mil) | PET-1 (0.47 mil) | 29.7 | 3.2X MD 3.9X TD 80° C$_t$ 97° C$_b$ | Front 38/42 Back 38/42 | No delamination; some curl, not bad |
| 46 | W | 80% sscPE-3 17% LLDPE 3% S&AB (0.71 mil) | sscPE-3 (0.08 mil) | mLLD-2 (0.08 mil) | EVOH-2 (0.08 mil) | 80% EMA 10% SEC 10% mLLD-3 (0.08 mil) | PET-1 (0.08 mil) | PET-1 (0.47 mil) | 29.7 | 3.2X MD 3.9X TD 83° C$_t$ 95° C$_b$ | Front 71% (L + T) Back 73% (L + T) | DNR |
| 47 | W | 80% sscPE-3 17% LLDPE 3% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 80% EMA 10% SEC 10% mLLD-3 (0.08 mil) | PETG (0.47 mil) | 29.7 | 3.5X MD 3.8X TD 89° C$_t$ DNR° C$_b$ | Front 71% (L + T) Back 76% (L + T) | Difficult to obtain stable bubble; material weak |
| 48 | W | 80% sscPE-3 17% LLDPE 3% S&AB (0.43 mil) | sscPE-3 (0.35 mil) | mLLD-2 (0.08 mil) | EVOH-2 (0.08 mil) | mLLD-2 (0.09 mil) | PET-1 (0.28 mil) | PET-1 (0.28 mil) | 35.2 | 3.2X MD 3.2X TD 85° C$_t$ 93° C$_b$ | DNR | DNR |
| 49 | W | 80% sscPE-3 15% LLDPE 5% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 85% EMA 15% SEC (0.08 mil) | PET-1 (0.47 mil) | 29.7 | 3.3X MD 3.6X TD 77° C$_t$ 88° C$_b$ | Front 35/40 Back 34/42 | No delamination; sample had severe curl |
| 50 | W | 80% sscPE-3 15% LLDPE 5% S&AB (0.71 mil) | mLLD-2 (0.08 mil) | 90% PA6/66 10% PA6I/6T (0.08 mil) | EVOH-3 (0.15 mil) | mLLD-2 (0.08 mil) | 85% EMA 15% SEC (0.08 mil) | PET-1 (0.47 mil) | 29.7 | 3.4X MD 3.6X TD 76° C$_t$ 87° C$_b$ | Front 37/46 Back 39/46 | No delamination; some curl |
| 51 | — | 80% sscPE-3 17% LLDPE 3% S&AB (0.71 mil) | sscPE-3 (0.31 mil) | mLLD-2 (0.08 mil) | EVOH-2 (0.08 mil) | PAMXD6 (0.08 mil) | 85% EMA 15% SEC (0.08 mil) | PETG (0.47 mil) | 29.9 | 3.7X MD 3.5X TD 80° C$_t$ 101° C$_b$ | No Sample Obained | No sample; poor bubble stability due to PETG |
| 52 | C | 80% sscPE-3 15% LLDPE 5% S&AB (0.71 mil) | sscPE-3 (0.16 mil) | mLLD-2 (0.08 mil) | EVOH-2 (0.08 mil) | 80% EMA 10% SEC (0.08 mil) | PET-1 (0.24 mil) | PET-1 (0.24 mil) | 30.1 | 3.3X MD 3.5X TD 81° C$_t$ 88° C$_b$ | Front 30/40 Back 34/43 | DNR |
| 53 | W | 80% sscPE-3 17% LLDPE 3% S&AB (0.47 mil) | sscPE-3 (0.44 mil) | mLLD-2 (0.15 mil) | EVOH-2 (0.15 mil) | 80% EMA 10% SEC (0.08 mil) | PET-1 (0.44 mil) | PET-1 (0.83 mil) | 46 | 3.2X MD 3.9X TD 84° C$_t$ 97° C$_b$ | Front 38/41 Back 39/41 | 70μ film; no delamination; one corner has pucker in one sample, flat, not much curl |
| 54 | W | 80% sscPE-3 17% LLDPE 3% S&AB (0.61 mil) | sscPE-3 (0.44 mil) | mLLD-2 (0.15 mil) | EVOH-2 (0.15 mil) | 80% EMA 10% SEC 10% mLLD-3 (0.15 mil) | PET-1 (0.44 mil) | PET-1 (0.83 mil) | 46 | 3.2X MD 4.1X TD | Front 35/37 | 40μ film thickness; DNR |

TABLE 2-continued

| Film No. | Work or comp | Layer 1 (inside) | Layer 2 | Layer 3 | Layer 4 | Layer 5 | Layer 6 | Layer 7 | Vol % PET | Orient (md & td) °$C_t$: tape °$C_b$: bubble | free shrink @185° F. (85 C.) Front (% TD/% MD) Back (% TD/MD %) | Comment |
|---|---|---|---|---|---|---|---|---|---|---|---|---|
| 55 | W | 3% S&AB (0.61 mil) | sscPE-3 (0.14 mil) | mLLD-2 (0.13 mil) | EVOH-2 (0.11 mil) | 10% mLLD-3 mLLD-2 (0.15 mil) (0.14 mil) | 80% EMA 10% SEC 10% mLLD-3 (0.11 mil) | PET-2 (0.63 mil) | 40 | 82° $C_t$ 97° $C_b$ 3.4X MD 4.1X TD 93° $C_t$ 98° $C_b$ | Back 33/37 Front 47/52 Back 50/53 | Sample hard and brittle; severe curl |
| 56 | W | 80% sscPE-3 17% LLDPE 3% S&AB (0.31 mil) | sscPE-3 (0.11 mil) | mLLD-2 (0.14 mil) | EVOH-2 (0.11 mil) | mLLD-2 (0.14 mil) | 80% EMA 10% SEC 10% mLLD-3 (0.23 mil) | PET-2 (0.43 mil) | 27 | 3.3X MD 4.01X TD 91° $C_t$ 94° $C_b$ | Front 40/45 Back 40/44 | 40μ film thickness; No delamination; severe curl |
| 57 | W | 80% sscPE-3 15% LLDPE 5% S&AB (0.42 mil) | sscPE-3 (0.31 mil) | mLLD-2 (0.08 mil) | EVOH-2 (0.08 mil) | mLLD-2 (0.08 mil) | 80% EMA 10% SEC 10% mLLD-3 (0.08 mil) | PET-1 (0.47 mil) | 30 | 3.3X MD 3.6X TD 79° $C_t$ 85° $C_b$ | Front 38/46 Back 36/40 | 70μ film thickness; DNR |
| 58 | W | 80% sscPE-3 15% LLDPE 5% S&AB (0.47 mil) | sscPE-3 (0.31 mil) | mLLD-2 (0.08 mil) | EVOH-2 (0.08 mil) | mLLD-2 (0.08 mil) | 80% EMA 10% SEC 10% mLLD-3 (0.08 mil) | PET-1 (0.47 mil) | 30 | 3.3X MD 3.6X TD 82° $C_t$ 86° $C_b$ | Front 35/35 Back 31/40 | 40μ film thickness; no delamination; Corner pucker; wrinkled samples, not much curl |
| 59 | W | 80% sscPE-3 15% LLDPE 5% S&AB (0.47 mil) | sscPE-3 (0.31 mil) | mLLD-2 (0.08 mil) | EVOH-2 (0.08 mil) | mLLD-2 (0.08 mil) | 80% EMA 10% SEC 10% mLLD-3 (0.08 mil) | PET-1 (0.47 mil) | 30 | 3.3X MD 3.6X TD 81° $C_t$ 86° $C_b$ | Front 40/45 Back 37/40 | 70μ film thickness; DNR |
| 60 | W | 80% sscPE-3 15% LLDPE 5% S&AB (0.47 mil) | mLLD-2 (0.08 mil) | 90% PA6/66 10% PA6I/6T (0.08 mil) | EVOH-2 (0.08 mil) | mLLD-2 (0.08 mil) | SEC (0.08 mil) | PET-1 (0.47 mil) | 30 | 3.2X MD 3.6X TD 77° $C_t$ 81° $C_b$ | Front 40/45 Back 41/45 | 40μ film thickness; One sample had edge delamination; sample curls |
| 61 | W | 80% sscPE-3 15% LLDPE 5% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 80% SEC 20% ENB (0.08 mil) | PET-1 (0.47 mil) | 30 | 3.2 X MD 3.6 X TD 77° $C_t$ 81° $C_b$ | Front 37/44 Back 35/45 | 40μ film thickness; No delamination; Sample curls |
| 62 | W | 80% sscPE-3 15% LLDPE 5% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 80% SBC 20% ENB (0.08 mil) | PET-1 (0.47 mil) | 30 | 3.0 X MD 3.9 X TD 81° $C_t$ 93° $C_b$ | Front 36/42 Back 37/42 | 40μ film thickness; hand sample only; could not stabilize for data; sample curls |
| 63 | W | 80% sscPE-3 15% LLDPE 5% S&AB (0.71 mil) | mLLD-2 (0.08 mil) | 90% PA6/66 10% PA6I/6T (0.08 mil) | EVOH-2 (0.08 mil) | mLLD-2 (0.08 mil) | 90% SBC 10% ENB (0.08 mil) | PET-1 (0.47 mil) |  | DNR 3.2 X MD 3.6 X TD 73° $C_t$ 91° $C_b$ | Front DNR Back DNR | No delamination |
| 64 | W | 80% sscPE-3 15% LLDPE 5% S&AB (0.77 mil) | mLLD-2 (0.52 mil) | 90% PA6/66 10% PA6I/6T (0.13 mil) | EVOH-2 (0.13 mil) | mLLD-2 (0.13 mil) | 65% SBC 25% EMA 10 PET-3 (0.29 mil) | PET-1 (0.77 mil) | 30 | 3.9 X MD 3.9 X TD 81° $C_t$ 93° $C_b$ | Front 29/33 Back 29/37 | 70μ film thickness; stable process; did not delaminate |

TABLE 2-continued

| Film No. | Work or comp | Layer 1 (inside) | Layer 2 | Layer 3 | Layer 4 | Layer 5 | Layer 6 | Layer 7 | Vol % PET | Orient (md & td) °C: tape °C_t; °C_b: bubble | free shrink @185° F. (85 C.) Front (% TD/% MD) Back (% TD/MD %) | Comment |
|---|---|---|---|---|---|---|---|---|---|---|---|---|
| 65 | W | 80% sscPE-3 15% LLDPE 5% S&AB (0.47 mil) | mLLD-2 (0.31 mil) | 90% PA6/66 10% PA6I/6T (0.08 mil) | EVOH-2 (0.08 mil) | mLLD-2 (0.08 mil) | 85% EMA 15% SEC (0.08 mil) | PET-1 (0.47 mil) | 30 | 3.3X MD 3.7X TD 77° C_t 88° C_b | Front 35/40 Back 34/42 | better tie; no stage 2 delamination; stable process; sample does curl but manageable; stage 1 delamination on use in flow wrap process |
| 66 | — | 80% sscPE-3 15% LLDPE 5% S&AB (0.83 mil) | mLLD-2 (0.55 mil) | 90% PA6/66 10% PA6I/6T (0.14 mil) | EVOH-2 (0.14 mil) | mLLD-2 (0.14 mil) | 85% EMA 15% SEC (0.14 mil) | PET-1 (0.83 mil) | 30 | DNR | DNR | No sample obtained; stage 4 delamination, i.e., at tape edge |
| 67 | — | 80% sscPE-3 15% LLDPE 5% S&AB (0.47 mil) | mLLD-2 (0.08 mil) | 90% PA6/66 10% PA6I/6T (0.08 mil) | EVOH-2 (0.08 mil) | mLLD-2 (0.08 mil) | 85% EMA 15% SEC (0.08 mil) | PET-1 (0.47 mil) | 30 | DNR | DNR | DNR for free shrink delamination; stage 1 delamination on use in flow wrap process |
| 68 | — | 80% sscPE-3 15% LLDPE 5% S&AB (0.71 mil) | mLLD-2 (0.55 mil) | 90% PA6/66 10% PA6I/6T (0.14 mil) | EVOH-2 (0.14 mil) | mLLD-2 (0.14 mil) | 75% SEC 25% EMA (0.14 mil) | PET-1 (0.83 mil) | 30 | 3.1X MD 3.8X TD 83° C_t 93° C_b | Front 28/36 Back 34/43 | 70µ film thickness; process relatively stable; no delamination upon free shrink; but stage 1 delamination on use in flow wrap process |
| 69 | W | 80% sscPE-3 17% LLDPE 3% S&AB (0.77 mil) | mLLD-2 (0.52 mil) | 90% PA6/66 10% PA6I/6T (0.13 mil) | EVOH-2 (0.13 mil) | mLLD-2 (0.13 mil) | 65% SEC 25% EMA 10% PET-3 (0.29 mil) | PET-1 (0.77 mil) | 29 | 3.0X MD 3.9X TD 81° C_t 93° C_b | Front 29/33 Back 29/37 | 70µ film thickness; very stable process; no delamination |
| 70 | — | 80% sscPE-3 15% LLDPE 5% S&AB (0.83 mil) | mLLD-2 (0.55 mil) | 90% PA6/66 10% PA6I/6T (0.14 mil) | EVOH-2 (0.14 mil) | mLLD-2 (0.14 mil) | 90% SEC 10% PET-3 (0.14 mil) | PET-1 (0.83 mil) | 30 | DNR | DNR | unstable process; could not make film |
| 71 | — | 80% sscPE-3 15% LLDPE 5% S&AB (0.83 mil) | mLLD-2 (0.55 mil) | 90% PA6/66 10% PA6I/6T (0.14 mil) | EVOH-2 (0.14 mil) | mEMA (0.14 mil) | 90% SEC 10% PETM (0.14 mil) | PET-1 (0.83 mil) | 30 | 3.0X MD 3.9X TD 80° C_t 92° C_b | Front 28/35 Back 29/36 | 70µ film thickness; unstable process; could not make film |
| 72 | W | 80% sscPE-4 15% LLDPE 5% S&AB (0.47 mil) | mLLD-2 (0.31 mil) | 90% PA6/66 10% PA6I/6T (0.08 mil) | EVOH-2 (0.08 mil) | mLLD-2 (0.08 mil) | 85% EMA 15% SEC (0.08 mil) | 95% PET-1 5% EMA (0.47 mil) | 28 | 3.2X MD 3.7X TD 80° C_t 90° C_b | Front 34/41 Back 34/40 | 40µ film thickness; stable process; no delamination |
| 73 | C | 80% sscPE-3 15% LLDPE 5% S&AB (0.78 mil) | mLLD-2 (0.52 mil) | 90% PA6/66 10% PA6I/6T (0.13 mil) | EVOH-2 (0.13 mil) | mLLD-2 (0.13 mil) | EMA-2 (0.29 mil) | PET-1 (0.78 mil) | 28 | 3.1X MD 3.8X TD 83° C_t 93° C_b | Front 34/41 Back 28/35 | 70µ film thickness; film delaminated upon shrink |
| 74 | C | 80% sscPE-3 15% LLDPE 5% S&AB (0.78 mil) | mLLD-2 (0.52 mil) | 90% PA6/66 10% PA6I/6T (0.13 mil) | EVOH-2 (0.13 mil) | mLLD-2 (0.13 mil) | PET4 (0.29 mil) | PET-1 (0.78 mil) | 28 | 3.0X MD 3.9X TD 83° C_t 95° C_b | Total free shrink about 70% | Delaminated upon shrinking |
| 75 | W | 80% sscPE-3 15% LLDPE 5% S&AB (0.78 mil) | mLLD-2 (0.52 mil) | 90% PA6/66 10% PA6I/6T (0.13 mil) | EVOH-2 (0.13 mil) | mLLD-2 (0.13 mil) | 90% SBC-3 10% EMA-2 (0.29 mil) | PET-1 (0.78 mil) | 28 | 3.1X MD 3.8X TD 83° C_t 92° C_b | Front 30/37 Back 29/37 | 70µ film thickness; stable process; no delamination |

TABLE 2-continued

| Film No. | Work or comp | Layer 1 (inside) | Layer 2 | Layer 3 | Layer 4 | Layer 5 | Layer 6 | Layer 7 | Vol % PET | Orient (md & td) °C_t: tape °C_b: bubble | free shrink @185° F. (85 C.) Front (% TD/% MD) Back (% TD/MD %) | Comment |
|---|---|---|---|---|---|---|---|---|---|---|---|---|
| 76 | W | 80% sscPE-3 15% LLDPE 5% S&AB (0.78 mil) | mLLD-2 (0.52 mil) | 90% PA6/66 10% PA6I/6T (0.13 mil) | EVOH-2 (0.13 mil) | mLLD-2 (0.13 mil) | 90% SBC-2 10% EMA-2 (0.29 mil) | PET-1 (0.78 mil) | 28 | 3.1X MD 3.8X TD 83° C_t 93° C_b | Front 30/39 Back 30/38 | 70μ film thickness; stable process; no delamination |
| 77 | W | 80% sscPE-3 15% LLDPE 5% S&AB (0.78 mil) | mLLD-2 (0.52 mil) | 90% PA6/66 10% PA6I/6T (0.13 mil) | EVOH-2 (0.13 mil) | mLLD-2 (0.13 mil) | 50% SBC-3 25% EMA-2 25% SEC (0.29 mil) | PET-1 (0.78 mil) | 28 | 3.1X MD 3.8X TD 82° C_t 92° C_b | Front 31/36 Back 32/40 | 70μ film thickness; some ripples; stable process; no delamination |
| 78 | W | 80% sscPE-3 15% LLDPE 5% S&AB (0.78 mil) | mLLD-2 (0.52 mil) | 90% PA6/66 10% PA6I/6T (0.13 mil) | EVOH-2 (0.13 mil) | mLLD-2 (0.13 mil) | 65% SEC 25% EMA-2 10% SBC-3 (0.29 mil) | PET-1 (0.78 mil) | 28 | 3.1X MD 3.8X TD 81° C_t 92° C_b | DNR | 70μ film thickness; stable process; no delamination |
| 79 | W | 80% sscPE-3 15% LLDPE 5% S&AB (0.78 mil) | mLLD-2 (0.47 mil) | 90% PA6/66 10% PA6I/6T (0.26 mil) | EVOH-2 (0.14 mil) | mLLD-2 (0.14 mil) | 65% SEC 25% EMA 10% PET3 (0.29 mil) | PET-1 (0.77 mil) | 28 | 3.1X MD 3.8X TD 83° C_t 93° C_b | Front 29/38 Back 28/37 | 70μ film thickness; no delamination 10% polyamide stable process |
| 80 | W | 80% sscPE-3 15% LLDPE 5% S&AB (0.77 mil) | mLLD-2 (0.52 mil) | 90% PA6/66 10% PA6I/6T (0.28 mil) | EVOH-2 (0.14 mil) | 90% PA6/66 10% PA6I/6T (0.14 mil) | 50% SBC-3 40% EMA 10% PET3 (0.29 mil) | PET-1 (0.63 mil) | 24 | 3.1X MD 3.8X TD 76° C_t 89° C_b | Front 24/33 Back 24/33 | 70μ film thickness; 15% polyamide no delamination |
| 81 | W | 80% sscPE-3 17% LLDPE 3% S&AB (0.47 mil) | mLLD-2 (0.31 mil) | 90% PA6/66 10% PA6I/6T (0.08 mil) | EVOH-2 (0.08 mil) | mLLD-2 (0.08 mil) | 85% SEC 15% EMA (0.08 mil) | 95% PET-1 5% EMA (0.47 mil) | 28 | 3.2X MD 3.7X TD DNR °C_t DNR °C_b | Front 36/36 Back 31/37 | 40μ film thickness; Stable process; hazy film No data no delamination |
| 82 | W | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SEC 25% EMA 10% PET3 (0.17 mil) | 95% PET-1 5% EMA-2 (0.44 mil) | 28 | 3.2X MD 3.7X TD 74° C_t 82° C_b | Front 32/34 Back 31/35 | 40μ film thickness; Enhanced tie similar to Example 67; need thicker tie layer to prevent melt ripples; no delamination |
| 83 | W | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SBC-2 25% EMA 10% PET3 (0.17 mil) | 95% PET-1 5% EBA (0.44 mil) | 27 | 3.2X MD 3.7X TD 74° C_t 82° C_b | DNR | 40μ film thickness; Stable process; no delamination |
| 84 | — | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SEC 25% EMA 10% PET3 (0.17 mil) | 95% PET-1 6.5% SEC 2.5% EMA 1% PET-3 (0.44 mil) | 25 | DNR | DNR | Severe melt ripples; could not run |
| 85 | — | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SBC-2 25% EMA 10% PET3 (0.17 mil) | 95% PET-1 5% SBC-2 (0.44 mil) | 25 | DNR | DNR | 40μ film thickness; unstable; melt ripples; could not produce film |
| 86 | W | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SBC-2 25% EMA 10% PET3 (0.17 mil) | PET-1 (0.44 mil) | 29 | 3.2X MD 3.7X TD 74° C_t 84° C_b | Front 31/33 Back 32/36 | 40μ film thickness; no delamination |

TABLE 2-continued

| Film No. | Work or comp | Layer 1 (inside) | Layer 2 | Layer 3 | Layer 4 | Layer 5 | Layer 6 | Layer 7 | Vol % PET | Orient (md & td) °C$_t$: tape °C$_b$: bubble | free shrink @185° F. (85 C.) Front (% TD/% MD) Back (% TD/MD %) | Comment |
|---|---|---|---|---|---|---|---|---|---|---|---|---|
| 87 | — | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SBC-2 25% EMA 10% PET-3 (0.17 mil) | 97% PET-1 3% EMA-3 (0.44 mil) | 27 | DNR | DNR | 40μ film thickness; gritty tape, surges, did not make 90/10, agglomeration of pellets in blender mixer, no samples; 97/3 could be made, gritty films |
| 88 | W | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SBC-2 25% EMA 10% PET-3 (0.17 mil) | 95% PET-1 5% EVA-2 (0.44 mil) | 28 | 3.1X MD 3.8X TD 74° C$_t$ 82° C$_b$ | Front 33/36 Back 31/34 | 40μ film thickness; |
| 89 | W | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SBC-2 25% EMA 10% PET-3 (0.17 mil) | 95% PET-1 4% EMA-4 1% Et-Cop (0.44 mil) | 28 | 3.2X MD 3.8X TD 74° C$_t$ 83° C$_b$ | Front 35/39 Back 32/34 | 40μ film thickness |
| 90 | W | 80% sscPE-3 17% LLDPE 3% S&AB (0.44 mil) | mLLD-2 (0.29 mil) | 90% PA6/66 10% PA6I/6T (0.08 mil) | EVOH-2 (0.08 mil) | mLLD-2 (0.08 mil) | 65% SBC-2 25% EMA 10% PET-3 (0.17 mil) | 95% PET-1 4% EMA 1% EMA-3 (0.44 mil) | 28 | 3.1 X MD 3.8 X TD 74° C$_t$ 83° C$_b$ | DNA | 40μ film thickness |
| 91 | W | 83.5% ssPE-3 15% LLDPE 5% S&AB (0.55 mil) | mLLD-2 (0.52 mil) | 90% PA 6 10% PA 6I/6T (0.44 mil) | EVOH-4 (0.11 mil) | 90% PA 6 10% PA 6I/6T (0.44 mil) | 60% g-LLDPE 30% g-SEC 10% PET-3 (0.41 mil) | PET-1 (0.28 mil) | 10 | DNA | 27% MD 35% TD | No Delamination |
| 92 | W | 83.5% ssPE-3 15% LLDPE 5% S&AB (0.55 mil) | mLLD-2 (0.52 mil) | 90% PA 6 10% PA 6I/6T (0.44 mil) | EVOH-4 (0.11 mil) | 90% PA 6 10% PA 6I/6T (0.44 mil) | 60% g-LLDPE 30% g-SEC 10% PET-3 (0.41 mil) | PET-1 (0.28 mil) | 10 | DNA | 26% MD 32% TD | No Delamination |
| 93 | C | 83.5% ssPE-3 15% LLDPE 5% S&AB (0.55 mil) | mLLD-2 (0.52 mil) | 90% PA 6/66 10% PA 6I/6T (0.44 mil) | EVOH-4 (0.11 mil) | 90% PA 6/66 10% PA 6I/6T (0.44 mil) | 60% g-LLDPE 30% SEC 10% PET-3 (0.41 mil) | PET-1 (0.28 mil) | 10 | DNA | 27% MD 34% TD | Delamination |

"—": film had tie layer comprising styrene based polymer but reason for inoperability believed unrelated to tie layer composition.

Films 1-90 are directed to films having an outer polyester layer, a barrier layer, and at least one tie layer between the outer polyester layer and the barrier, without a polyamide layer between the outer polyester layer and the barrier layer. A review of these films reveals the effect of having a styrene-based polymer in the tie layer between the outer polyester layer and the barrier layer: of the nineteen films lacking a styrene-based polymer in this tie layer, recorded data indicating the presence of delamination is set forth for eleven of these films (i.e., films 1, 2, 3, 6, 7, 8, 10, 12, 15, 18, and 74). This delamination was delamination upon upon conducting unrestrained free shrink via immersion in 85° C. water for 8 seconds, using ASTM D2732 (stage 2 delamination), or delamination upon handling the film after orientation and annealing (stage 3 delamination) or delamination upon extrusion of the tape, i.e., before orientation (stage 4 delamination). No indication of whether or not delamination occurred was recorded for the eight remaining films films (i.e., films 4, 5, 9, 11, 16, 17, 52 and 72) which lacked a tie layer containing a styrene-based polymer. Each of the eighteen films lacking a styrene-based polymer in the tie layer is designated as a comparative example ("C") in the second column of Table 2.

In contrast, in each of the remaining eighty-one films in Table 2, the tie layer between the outer polyester layer and the barrier layer contained a styrene-based polymer. Thirty-four of the eighty-one films (i.e., films 13, 14, 24-31, 33, 43-45, 49, 50, 56, 58, 60, 61, 63, 64, 65, 69, 72, 75-80, 82, 83, and 86) included an express comment indicating that these films exhibited no delamination. Twenty-five of the eighty-one films (i.e., films 22, 23, 32, 34-42, 46-48, 53-55, 57, 59, 62, 81, and 88-90) included no express comment on the presence or absence of delamination. However, if stage 2, 3, or 4 delamination had occurred for any of these films, it is believed that data would have been recorded of such delamination if in fact it had occurred, as the comment "delaminated" was recorded for various samples outside this group. As no such comment was recorded, it is believed that these twenty-five samples also did not experience stage 2, 3, or 4 delamination.

Six of the eighty-one films (i.e., films 51, 70, 71, 84, 85, and 87) could not be produced for various reasons such as unstable process and surges. Another six films (i.e., films 19, 20, 21, 66, 67, and 68) exhibited delamination even though they had a styrene-based polymer in the tie layer adjacent the outer polyester layer. For three of these films, i.e., films 19, 20, and 21, data indicates the potential reason for the delamination is that the process conditions were not optimized. The remaining three films that delaminated, i.e., films 66, 67, and 68, it is not known why delamination occurred.

In summary, it was found that of the ninety heat shrinkable films, the totality of the data supports the conclusion that presence of a tie layer containing a styrene-based copolymer between the PET layer and the barrier layer decreased or eliminated stage 2 through stage 4 film delamination. In contrast, it was discovered that heat shrinkable films which lacked a styrene based copolymer between the PET layer and the barrier layer had a substantially greater chance of exhibiting stage 2 to stage 4 delamination.

Fourteen films (i.e., films 64, 69, 70, 79, 80, and 82-90) had a tie layer containing a blend of the styrene-based polymer with a copolyester having a low melting point (121° C.). Some of these films were used to make packaging articles that exhibited superior burst strength due to their enhanced resistance to delamination.

The films that delaminated upon shrinking exhibited visible signs of delamination. These visible signs of delamination included, among other visible signs, one or more of (i) delaminated layers at the sample edge (ii) "white spots" inward of the sample edge, caused by layer delamination, (iii) a highly wrinkled film appearance in discrete areas or throughout the sample, sometimes on only one principal surface of the sample, and (iv) areas of decreased film transparency, or whole-film decrease in transparency.

Films 91-93 are directed to multilayer heat shrinkable coextruded films having an outer polyester layer, a first inner layer comprising a polyamide, and a second inner layer between the polyester layer and the layer comprising the polyamide. Film 91 and Film 92 above were working examples in accordance with the present invention. Film 91 and Film 92 each had an outer layer comprising a polyethylene terephthalate copolymer having a melt point of 255° C., and a first inner polyamide layer made up of a blend of 90 wt % semicrystalline polyamide (PA6) and 10 wt % amorphous polyamide (PA 6I/6T). Between the outer polyester layer and the polyamide layer was a tie layer comprising a blend of (i) 60 wt % anhydride-grafted LLDPE, 30 wt % anhydride-grafted styrene ethylene butylene triblock copolymer, and 10 wt % polyester.

During production, both Film 91 and Film 92 were produced as film tubing without significant process instability, i.e., without melt ripples and without bubble breaks. Moreover, after production, the heat-shrinkable film tubings of Film 91 and Film 92 were each slit and wound up as flat film rollstock. Samples of each of Film 91 and Film 92 were shrunk in a hot water bath by immersion in water at 85° C. for 8 seconds. Neither Film 91 nor Film 92 experienced delamination during production or during shrinking.

The rollstock was thereafter used on a horizontal form fill and seal machine as illustrated in FIG. 16, described above. After sealing across the tubing upstream of the meat product, the resulting open package (318) having the meat therein was forwarded to a vacuum chamber machine. While in the vacuum chamber, atmosphere was evacuated from inside the package and the package was sealed closed. The excess film was then cut off above the heat seal and the resulting packaged product was sent through a hot water bath to shrink the film tight around the meat product. Neither Film 91 nor Film 92 experienced delamination during production or during shrinking.

Film 93 was a comparative example. Film 93 was a heat-shrinkable film produced in the same manner as used for the production of Film 91 and Film 92. Film 93 differed from Film 91 only in that the tie layer between the outer polyester layer and the inner polyamide layer comprised a blend of 60 wt % anhydride grafted LLDPE, 30 wt % non-grafted styrene-ethylene-butylane copolymer, and 10 wt % polyester. That is, the 3-component blend in the tie layer of Film 93 used 30 wt % non-grafted terpolymer rather than the 30 wt % anhydride-grafted styrene-ethylene-butylene copolymer used in Film 91 and Film 92.

Unlike Film 91, during production Film 93 exhibited process instability in the formation of melt ripples. Moreover, after production, Film 93 delaminated upon immersion for 8 seconds in water at 85° C.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

What is claimed is:

1. A multilayer heat-shrinkable film comprising:
   (A) a first layer comprising a first polyester, the first layer being an outer layer;
   (B) a second layer which serves as a heat seal layer, the second layer being an outer layer;
   (C) a third layer which serves as an $O_2$-barrier layer, the third layer comprising at least one member selected from the group consisting of saponified ethylene/vinyl acetate copolymer, polyamide MXD6, polyamide 6I/6T, polyamide 6, polyvinylidene chloride, polyethylene naphthalate, polytrimethylene terephthalate, liquid crystal polymer, and $O_2$-scavenger;
   (D) a fourth layer which serves as a tie layer directly adhered to both the first layer and the third layer, the fourth layer comprising a blend of:
      a. a modified polyolefin;
      b. a styrene-based polymer; and
      c. a second polyester present in an amount of between at least 2 wt % and up to 20 wt % of the weight of the fourth layer
   wherein the multilayer heat shrinkable film exhibits a total free shrink at 85° C. of at least 10% measured in accordance with a modified free shrink test otherwise in accordance with ASTM D 2732, and the first polyester is present in the film in an amount of at least 2 vol %, based on total film volume.

2. The multilayer heat shrinkable film according to claim 1, wherein the film exhibits a total free shrink at 85° C. of at least 30% measured in accordance with the modified free shrink test otherwise in accordance with ASTM D 2732.

3. The multilayer heat shrinkable film according to claim 1, wherein the first polyester comprises polyethylene terephthalate having a melting point of at least 240° C.

4. The multilayer heat shrinkable film according to claim 1, wherein the film has a total thickness of from 1.5 mils to 4 mils.

5. A multilayer heat-shrinkable film comprising:
   (A) a first layer comprising a first polyester, the first layer being an outer layer;
   (B) a second layer which serves as a heat seal layer, the second layer being an outer layer;
   (C) a third layer which serves as an $O_2$-barrier layer, the third layer comprising at least one member selected from the group consisting of saponified ethylene/vinyl acetate copolymer, polyamide MXD6, polyamide 6I/6T, polyamide 6, polyvinylidene chloride, polyethylene naphthalate, polytrimethylene terephthalate, liquid crystal polymer, and $O_2$-scavenger;
   (D) a fourth layer which serves as a tie layer directly adhered to both the first layer and the third layer, the fourth layer comprising a blend of:
      a. a modified polyolefin present in an amount of between at least 40 wt % and up to 70 wt % of the weight of the fourth layer;
      b. a styrene-based polymer; and
      c. a second polyester,
   wherein the multilayer heat shrinkable film exhibits a total free shrink at 85° C. of at least 10% measured in accordance with a modified free shrink test otherwise in accordance with ASTM D 2732, and the first polyester is present in the film in an amount of at least 2 vol %, based on total film volume.

6. The multilayer heat shrinkable film according to claim 5, wherein the modified polyolefin comprises an anhydride-functional polyolefin.

7. The multilayer heat shrinkable film according to claim 5, wherein the first polyester comprises at least one semi-crystalline polyester selected from the group consisting of polyethylene terephthalate homopolymer, polyethylene terephthalate copolymer, polybutylene terephthalate homopolymer, polybutylene terephthalate copolymer, polynaphthalene terephthalate homopolymer, polynaphthalene terephthalate copolymer, polyethylene furanoate homopolymer, and polyethylene furanoate copolymer, wherein the semicrystalline polyester has a melting point of from 80° C. to 265° C.

8. The multilayer heat shrinkable film according to claim 5, wherein the first polyester comprises amorphous polyester.

9. The multilayer heat shrinkable film according to claim 5, wherein the film exhibits a total free shrink at 85° C. of from 40% to 90% measured in accordance with the modified free shrink test otherwise in accordance with ASTM D 2732.

10. The multilayer heat shrinkable film according to claim 5, wherein the second layer comprises at least one member selected from the group consisting of polyolefin, polyamide, polyester, polyvinyl chloride, and ionomer resin.

11. The multilayer heat shrinkable film according to claim 5, wherein the film is in the form of a seamless tubing having a lay-flat width of from 40 to 1000 millimeters, a thickness of from 1 to 5 mils.

12. The multilayer heat shrinkable film according to claim 5, wherein the film is in the form of a packaging article selected from the group consisting of end-seal bag, side-seal bag, L-seal bag, backseamed bag, and pouch.

13. The multilayer heat shrinkable film according to claim 12, wherein a food product is inside the packaging article.

14. A multilayer heat-shrinkable film comprising:
   (A) a first layer comprising a first polyester, the first layer being an outer layer;
   (B) a second layer which serves as a heat seal layer, the second layer being an outer layer;
   (C) a third layer which serves as an $O_2$-barrier layer, the third layer comprising at least one member selected from the group consisting of saponified ethylene/vinyl acetate copolymer, polyamide MXD6, polyamide 6I/6T, polyamide 6, polyvinylidene chloride, polyethylene naphthalate, polytrimethylene terephthalate, liquid crystal polymer, and $O_2$-scavenger;
   (D) a fourth layer which serves as a tie layer directly adhered to both the first layer and the third layer, the fourth layer comprising a blend of:
      a. a modified polyolefin;
      b. a styrene-based polymer present in an amount of between at least 20 wt % and up to 40 wt % of the weight of the fourth layer; and
      c. a second polyester,
   wherein the multilayer heat shrinkable film exhibits a total free shrink at 85° C. of at least 10% measured in accordance with a modified free shrink test otherwise in accordance with ASTM D 2732, and the first polyester is present in the film in an amount of at least 2 vol %, based on total film volume.

15. The multilayer heat shrinkable film according to claim 14, wherein the styrene-based polymer comprises at least one member selected from the group consisting of styrene-ethylene-butylene-styrene copolymer, styrene-butadiene-styrene copolymer, styrene-isoprene-styrene copolymer, styrene-ethylene-butadiene-styrene copolymer, styrene-(ethylene-propylene rubber)-styrene copolymer, and polystyrene-poly(ethylene-propylene)-polystyrene copolymer.

16. The multilayer heat shrinkable film according to claim 14, wherein the first polyester is present in the film in an amount of at least 20 vol %, based on total film volume.

17. The multilayer heat shrinkable film according to claim 14, wherein the film is in the form of a seamless tubing having a lay-flat width of from 300 to 1000 millimeters, a thickness of from 2 to 5 mils.

18. The multilayer heat shrinkable film according to claim 14, wherein the second layer comprises at least one member selected from the group consisting of polyolefin, polyamide 6/12, polyamide 12, ionomer resin, ethylene/unsaturated acid copolymer, ethylene/unsaturated ester copolymer, polyester having melting point of up to 150° C.

19. A process for packaging a food product comprising the steps of:
  (A) providing a multilayer heat shrinkable film; the multilayer heat-shrinkable film comprising:
    a. a first layer comprising a first polyester, the first layer being an outer layer;
    b. a second layer which serves as a heat seal layer, the second layer being an outer layer;
    c. a third layer which serves as an $O_2$-barrier layer, the third layer comprising at least one member selected from the group consisting of saponified ethylene/vinyl acetate copolymer, polyamide MXD6, polyamide 6I/6T, polyamide 6, polyvinylidene chloride, polyethylene naphthalate, polytrimethylene terephthalate, liquid crystal polymer, and $O_2$-scavenger;
    d. a fourth layer which serves as a tie layer directly adhered to both the first layer and the third layer, the fourth layer comprising a blend of:
      i. a modified polyolefin;
      ii. a styrene-based polymer; and
      iii. a second polyester,
        wherein (i) the a second polyester is present in the fourth layer in an amount of between at least 2 wt % and up to 20 wt % of the weight of the fourth layer (ii) the styrene-based polymer is present in the fourth layer in an amount of between at least 20 wt % and up to 40 wt % of the weight of the fourth layer, or (iii) the modified polyolefin is present in the fourth layer in an amount of between at least 40 wt % and up to 70 wt % of the weight of the fourth layer
    e. wherein the multilayer heat shrinkable film exhibits a total free shrink at 85° C. of at least 10% measured in accordance with a modified free shrink test otherwise in accordance with ASTM D 2732, and the first polyester is present in the film in an amount of at least 2 vol %, based on total film volume
  (B) forming the multilayer heat shrinkable film into a packaging article or utilizing the film in a flow wrap process to produce a partially packaged product comprising a backseamed packaging article having a bottom seal and an open top, the packaging article having a product therein;
  (C) evacuating atmosphere from within the packaging article and sealing the packaging article closed so that the product is surrounded by the packaging article; and
  (D) shrinking the packaging article around the product.

* * * * *